(12) United States Patent
Oba

(10) Patent No.: US 11,052,833 B2
(45) Date of Patent: Jul. 6, 2021

(54) CAMERA MOUNTING STRUCTURE, CAMERA APPARATUS, AND JACKET

(71) Applicant: SONY SEMICONDUCTOR SOLUTIONS CORPORATION, Kanagawa (JP)

(72) Inventor: Eiji Oba, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/349,511

(22) PCT Filed: Oct. 19, 2017

(86) PCT No.: PCT/JP2017/037864
§ 371 (c)(1),
(2) Date: May 13, 2019

(87) PCT Pub. No.: WO2018/105245
PCT Pub. Date: Jun. 14, 2018

(65) Prior Publication Data
US 2019/0337466 A1 Nov. 7, 2019

(30) Foreign Application Priority Data
Dec. 5, 2016 (JP) .............................. JP2016-236109

(51) Int. Cl.
*B60R 11/04* (2006.01)
*B60R 1/00* (2006.01)
(Continued)

(52) U.S. Cl.
CPC ................ *B60R 11/04* (2013.01); *B60R 1/00* (2013.01); *G03B 17/08* (2013.01); *H01R 13/627* (2013.01);
(Continued)

(58) Field of Classification Search
CPC ... B60R 11/04; B60R 1/00; B60R 2011/0071; B60R 2300/80; B60R 11/02;
(Continued)

(56) References Cited

U.S. PATENT DOCUMENTS 5,199,897 A 4/1993 Hashiguchi
5,470,255 A 11/1995 McCleerey et al.
(Continued)

FOREIGN PATENT DOCUMENTS

CN 1101757 A 4/1995
CN 101428591 A 5/2009
(Continued)

OTHER PUBLICATIONS

International Search Report and Written Opinion of PCT Application No. PCT/JP2017/037864, dated Jan. 23, 2018, 12 pages of ISRWO.

*Primary Examiner* — Shahbaz Nazrul
(74) *Attorney, Agent, or Firm* — Chip Law Group

(57) ABSTRACT

Provided is a camera mounting structure for attaching an in-vehicle camera to a vehicle. An optical protection window cover 503 is inserted into an opening 500 on the vehicle body side together with a camera 500 main body. It is possible to reduce the proportion of the water droplet 502 adhering to the surface of the optical protection window cover 503 with respect to the viewing angle of the camera 500, enabling the observer to visually recognize the presence of the water droplet 502 in visual examination of an image. In addition, the optical protection window cover 503 uses its body 602 to cover the side surface of a camera apparatus main body to implement positional alignment of a camera apparatus.

16 Claims, 27 Drawing Sheets

(51) Int. Cl.
*G03B 17/08* (2021.01)
*H01R 13/627* (2006.01)
*H04N 5/225* (2006.01)
*B60R 11/00* (2006.01)

(52) U.S. Cl.
CPC ......... *H04N 5/2252* (2013.01); *H04N 5/2257* (2013.01); *B60R 2011/0071* (2013.01); *B60R 2300/80* (2013.01)

(58) Field of Classification Search
CPC ...... G03B 17/08; G03B 29/00; H01R 13/627; H04N 5/2252; H04N 5/2257; G06Q 30/0277; G06Q 20/123; G06Q 30/0273; G06Q 30/02; G06F 3/0482; G06F 3/011; G06F 3/017; G06F 3/04815; G06F 3/04883; G06F 3/167; G06T 13/40; G06T 19/20; G06T 19/006; H04M 1/724; H04L 67/38

See application file for complete search history.

(56) References Cited

U.S. PATENT DOCUMENTS

| | | | |
|---|---|---|---|
| 10,270,950 B2* | 4/2019 | Avalos | B29C 66/112 |
| 2004/0208497 A1 | 10/2004 | Seger et al. | |
| 2009/0122141 A1 | 5/2009 | Nakamura et al. | |
| 2011/0199485 A1 | 8/2011 | Nakamura | |
| 2013/0222686 A1* | 8/2013 | Baek | H04N 5/2257 348/374 |
| 2014/0093682 A1* | 4/2014 | Nakamoto | C08J 5/045 428/141 |
| 2015/0195435 A1* | 7/2015 | Oshida | H04N 5/2253 348/373 |
| 2015/0296108 A1* | 10/2015 | Hayakawa | G02B 27/0006 348/148 |
| 2015/0327377 A1* | 11/2015 | Mano | H05K 5/0069 361/807 |
| 2016/0264064 A1* | 9/2016 | Byrne | H04N 5/2257 |
| 2017/0210304 A1* | 7/2017 | Davies | H04N 7/183 |
| 2018/0186341 A1* | 7/2018 | Kimura | B60S 1/56 |
| 2019/0086773 A1* | 3/2019 | Okamura | B60S 1/56 |
| 2020/0324738 A1* | 10/2020 | Kubota | B60R 1/00 |

FOREIGN PATENT DOCUMENTS

| | | |
|---|---|---|
| CN | 102162977 A | 8/2011 |
| DE | 4428192 A1 | 2/1995 |
| DE | 10162652 A1 | 7/2003 |
| EP | 0617486 A1 | 9/1994 |
| GB | 2280995 A | 2/1995 |
| JP | 07-236134 A | 9/1995 |
| JP | 2541592 B2 | 10/1996 |
| JP | 2541592 Y2 | 10/1996 |
| JP | 2541592 Y2 | 7/1997 |
| JP | 11-112968 A | 4/1999 |
| JP | 3061097 B2 | 7/2000 |
| JP | 2001-197337 A | 7/2001 |
| JP | 2005-512876 A | 5/2005 |
| JP | 2007-261503 A | 10/2007 |
| JP | 2009-113735 A | 5/2009 |
| JP | 2009-113736 A | 5/2009 |
| JP | 2011-164461 A | 8/2011 |
| JP | 2015-046775 A | 3/2015 |
| WO | 2003/053743 A1 | 7/2003 |

* cited by examiner

FIG. 6
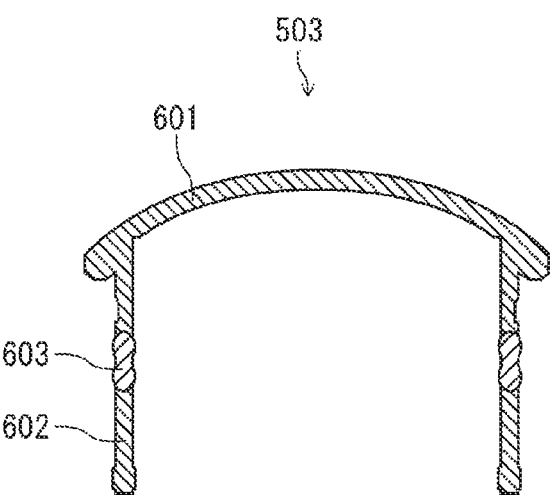
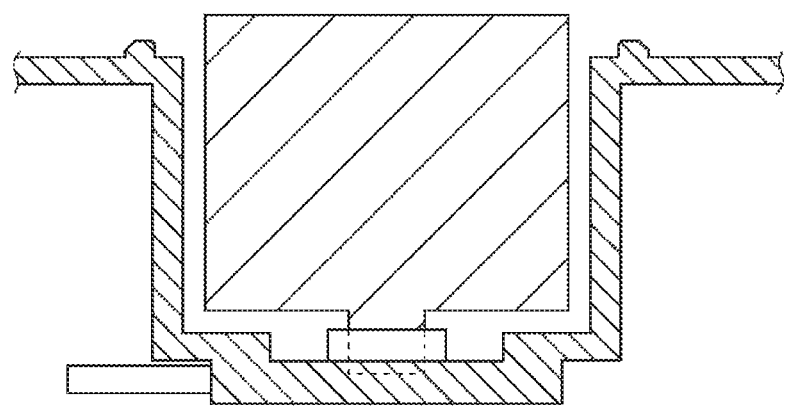

FIG. 10
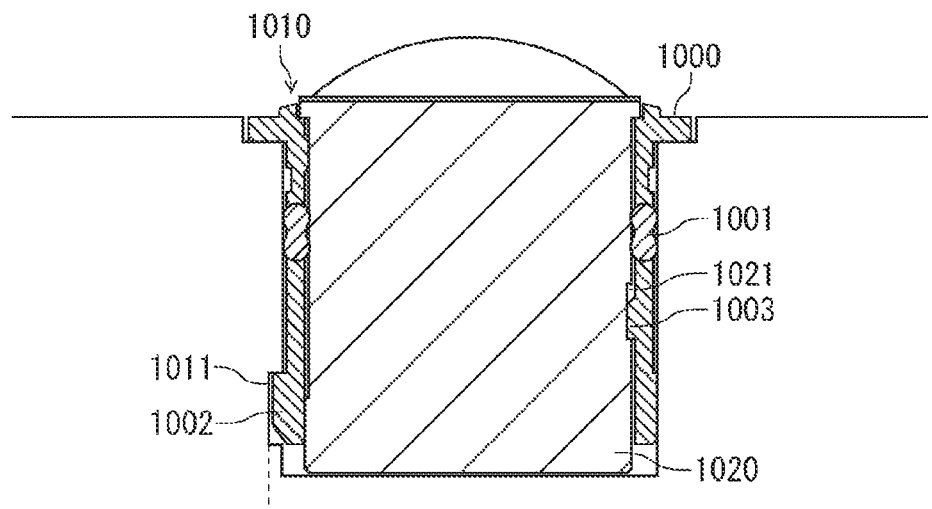
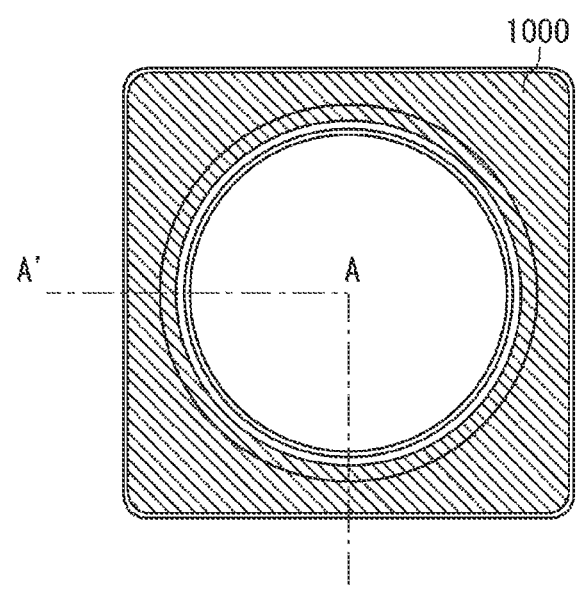

CAMERA MOUNTING STRUCTURE, CAMERA APPARATUS, AND JACKET

CROSS REFERENCE TO RELATED APPLICATIONS

This application is a U.S. National Phase of International Patent Application No. PCT/JP2017/037864 filed on Oct. 19, 2017, which claims priority benefit of Japanese Patent Application No. JP 2016-236109 filed in the Japan Patent Office on Dec. 5, 2016. Each of the above-referenced applications is hereby incorporated herein by reference in its entirety.

TECHNICAL FIELD

The technology disclosed herein relates to a camera mounting structure configured to mount an in-vehicle camera to a vehicle, a camera apparatus, and a jacket.

BACKGROUND ART

Recently, a larger number of automobiles are equipped with cameras. For example, a round-view camera including a rear camera can be an extremely effective means for safety in a vehicle type having a high driver's seat surface and thus having a wider blind spots for the driver, such as a sport utility vehicle (SUV) and the like in that it can prevent accidents against small children overlooked at the time of backing the automobile. In North America and other countries, installation of in-vehicle cameras is mandated. Similarly to operating a lighting device during nighttime driving, normal operation of an in-vehicle camera throughout the operation time of the vehicle is now needed.

In-vehicle cameras intended for around viewing are mounted to a plurality of positions of a vehicle body, for example, at front grille, rear garnish, mirror housing or the like. In addition, in order to ensure the accuracy of the mounting position, a casing of the in-vehicle camera is typically secured by interposing a mounting conversion member also called a "bracket" between the camera and the vehicle body by screwing or the like (for example, refer to Patent Documents 1 and 2).

CITATION LIST

Patent Document

Patent Document 1: Japanese Patent Application Laid-Open No. 2007-261503
Patent Document 2: Japanese Patent Application Laid-Open No. 2009-113735
Patent Document 3: Japanese Patent No. 3061097

SUMMARY OF THE INVENTION

Problems to be Solved by the Invention

An object of the technology disclosed in the present specification is to provide a camera mounting structure, a camera apparatus, and a jacket that can suitably mount an in-vehicle camera to a vehicle.

Solutions to Problems

The technology disclosed in the present specification has been made in consideration of the above-described problem, and one embodiment of this technology is a camera mounting structure including:
an opening formed in a vehicle body to accommodate an in-vehicle camera; and
a jacket retained on the opening and configured to retain the in-vehicle camera. Here, the opening is molded by a second mold created separately from a first mold, which is incorporated as a nested structure into a part of the first mold for molding the vehicle body, making it possible to increase the molding accuracy of the camera in the mounting direction, for example, an order of magnitude higher than the molding accuracy of the vehicle body. Furthermore, the jacket may be formed integrally with the vehicle body. Alternatively, the jacket may be formed integrally with the in-vehicle camera.

According to a second aspect of the technology disclosed in the present specification, in the camera mounting structure according to the first aspect, the jacket includes a body that covers a side surface of the in-vehicle camera.

According to a third aspect of the technology disclosed in the present specification, in the camera mounting structure according to the first aspect, the jacket further includes a transparent head that covers a lens or an optical window of the in-vehicle camera.

According to a fourth aspect of the technology disclosed in the present specification, in the camera mounting structure according to the third aspect, the head of the jacket is disposed separated from the lens or the optical window of the in-vehicle camera.

According to a fifth aspect of the technology disclosed in the present specification, the camera mounting structure according to the first aspect further includes a waterproof part that prevents water flowing into a gap between the opening and the in-vehicle camera.

According to a sixth aspect of the technology disclosed in the present specification, in the camera mounting structure according to the fifth aspect, the jacket includes an influent trap in front of the waterproof part.

According to a seventh aspect of the technology disclosed in the present specification, in the camera mounting structure according to the first aspect, the jacket includes a first latch unit, and the opening includes a first fitting portion to be fitted with the first latch unit.

According to an eighth aspect of the technology disclosed in the present specification, in the camera mounting structure according to the first aspect, the jacket includes a second latch unit, and the in-vehicle camera includes a second fitting portion to be fitted with the second latch unit.

According to a ninth aspect of the technology disclosed in the present specification, the camera mounting structure according to the first aspect further includes a connector to electrically connect the in-vehicle camera to the vehicle body at the opening.

According to a tenth aspect of the technology disclosed in the present specification, in the camera mounting structure according to the ninth aspect, the connector includes a connector plug disposed in the in-vehicle camera and a connector receptacle disposed at a corresponding location on the opening.

According to an eleventh aspect of the technology disclosed in the present specification, in the camera mounting structure according to the tenth aspect, the connector plug further includes a cam structure to be slidably inserted into the connector receptacle when the in-vehicle camera is inserted into the opening.

According to a twelfth aspect of the technology disclosed in the present specification, the camera mounting structure according to the ninth aspect is configured to implement the electrical connection using a coaxial cable.

Moreover, a thirteenth aspect of the technology disclosed in the present specification is a camera apparatus to be mounted to an opening of a vehicle body using a jacket, the camera apparatus including:

a fitting portion to be fitted with a latch on the jacket side; and a connector electrically connected to the vehicle body at the opening.

Moreover, a fourteenth aspect of the technology disclosed in the present specification is a jacket to be mounted to an opening of a vehicle body into which a camera apparatus is to be inserted, the jacket including:

a first latch to be fitted to the opening; and a second latch to be fitted to the camera apparatus.

Effects of the Invention

According to the technology disclosed in the present specification, it is possible to provide a camera mounting structure capable of mounting an in-vehicle camera to a large-sized component of a vehicle with high mounting accuracy.

Note that the effects described in the present specification are merely examples, and the effects of the present invention are not limited to the described effects. Furthermore, the present invention can further exert additional effects in addition to the above effects in some cases.

Still other objects, features and advantages disclosed in the present disclosure will become apparent from the detailed description based on the embodiments of the present disclosure to be described later and attached drawings.

BRIEF DESCRIPTION OF DRAWINGS

FIG. 6 is a cross-sectional view illustrating a state before attaching the optical protection window cover to the surface of the camera inserted in the vehicle body.

FIG. 10 is a view illustrating a specific configuration example of a locking mechanism of a lock jacket.

MODE FOR CARRYING OUT THE INVENTION

Hereinafter, embodiments of the technology disclosed in the present specification will be described in detail with reference to the drawings.

In-vehicle cameras are rapidly spreading, and installation of in-vehicle cameras is mandatory in some countries. The in-vehicle camera can be also defined as a camera apparatus used in a state of being mounted on a vehicle.

Figure 1:
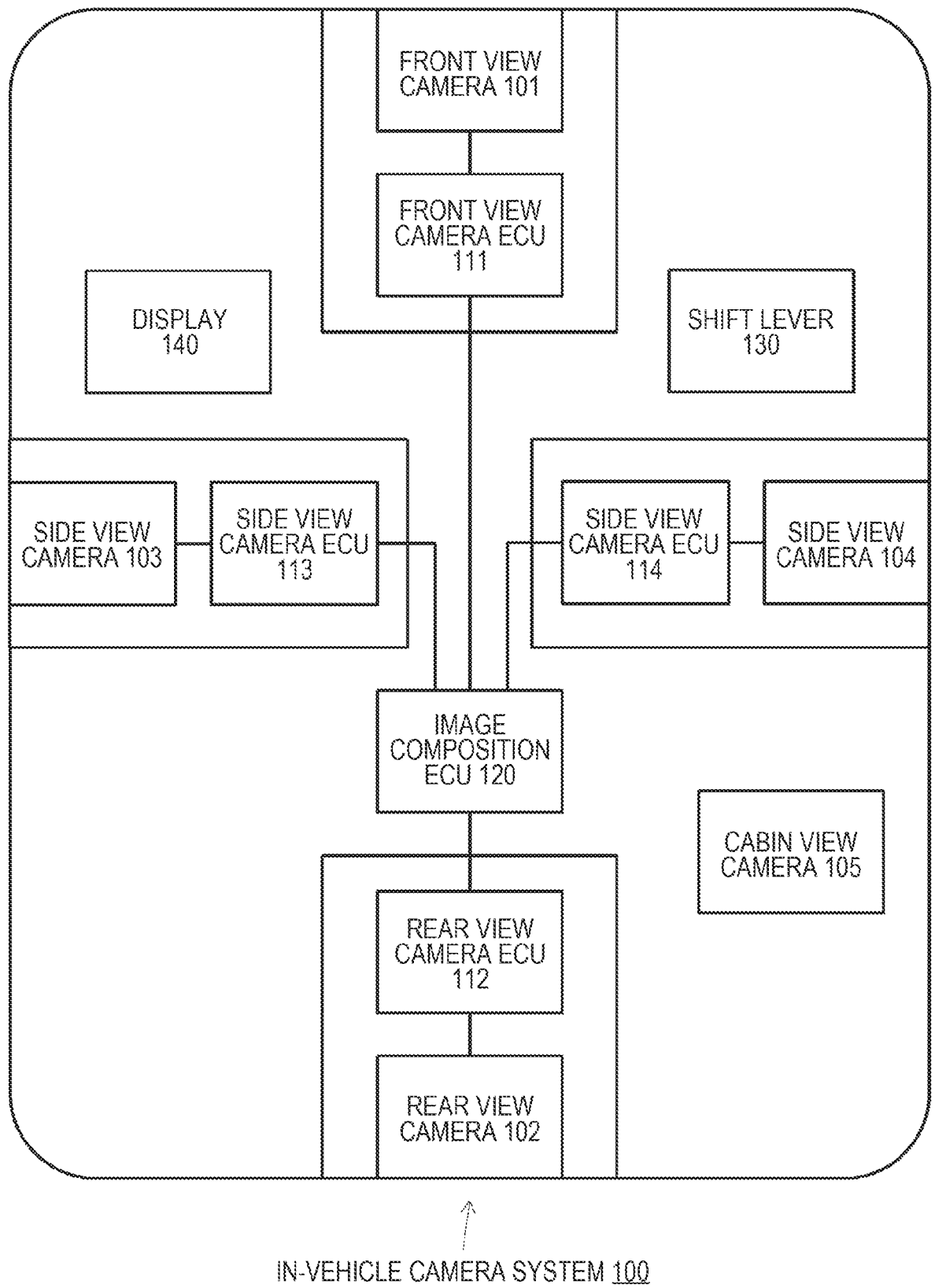
FIG. 1 is a diagram illustrating a configuration example of an in-vehicle camera system 100.

FIG. 1 schematically illustrates a configuration example of an in-vehicle camera system 100 mounted on a vehicle. The illustrated in-vehicle camera system 100 includes a total of four in-vehicle cameras, namely, a front view camera 101, a rear view camera 102, and left and right side view cameras 103 and 104. However, there is no need to provide four in-vehicle cameras. For example, an in-vehicle camera system can be configured even with one camera of the front view camera 101, or with five or more cameras mounted on the vehicle.

Basically, while images captured by the in-vehicle cameras 101 to 104 are used for image display purposes in the vehicle interior, it is also possible to use the images for object recognition (sensing) such as surrounding vehicles and pedestrians, roads (lanes), and road signs, for example. The technology disclosed in the present specification is supposed to be applied to at least one of the in-vehicle cameras 101 to 104. Furthermore, the technology disclosed in the present specification may also be applied to a cabin view camera 105 installed in a passenger compartment to capture the state of the driver.

For example, the front view camera 101 is installed in the vicinity of the front grille of the vehicle and images a region which is a blind spot from a driver in front of the vehicle. In addition, the front view camera 101 captures images used in an upper region of the around view monitor (AVM).

A front view camera electronic control unit (ECU) 111 performs signal processing including image quality enhancement such as white balance adjustment on the image captured by the front view camera 101. The image data that has undergone image processing is transmitted to an image composition ECU 120 via a cable different from a controller area network (CAN).

The cable here may be a coaxial cable or a twisted pair cable. Examples of a communication method include Low Voltage Differential Signaling (LVDS), Mobile Industry Processor Interface (MIPI), Ethernet, Gigabit Video Interface (GVIF), Gigabit Multimedia Serial Link (GMSL), Flat Panel Display (FPD)-Link III, and other standards.

The rear view camera 102 is mounted near a tail gate of a vehicle, for example. Specific examples of mounting positions include the side of the handle portion of the tail gate and the vicinity of the license plate. An optical axis direction of the rear view camera 102 is preferably directed slightly downward from the horizontal direction. The rear view camera 102 captures an image of a blind spot region from a driver behind the vehicle and also captures an image used in the lower region of the AVM. For example, setting the shift lever 130 of the vehicle to "rearward (R)" starts the rear view camera 102.

The rear view camera ECU 112 performs signal processing including image quality enhancement such as white balance adjustment on the image captured by the rear view camera 102. The image data that has undergone image processing is transmitted to the image composition ECU 120 via a cable (same as above) different from the CAN.

The side view cameras 103 and 104 are disposed in the side mirror casing or in the vicinity of the side mirror, for example, and captures an image of a blind spot region for the driver located on the left and right of the vehicle and captures images to be used for each of left and right regions of the AVM. Furthermore, the side view cameras 103 and 104 may be applied to a mirrorless vehicle having a camera monitoring system (CMS) installed instead of a side mirror.

The side view camera ECUs 113 and 114 perform signal processing including image quality enhancement such as white balance adjustment on images captured by the side view cameras 103 and 104, respectively. The image data that has undergone image processing is transmitted to the image composition ECU 120 via a cable (same as above) different from the CAN.

The image composition ECU 120 combines images captured by the in-vehicle cameras 101 to 104 on the front, rear, and sides to generate an around-view image.

A display 140 displays images captured by the in-vehicle cameras 101 to 104 on the front, the rear, and the side. For example, images captured by the in-vehicle cameras 101 to 104 on the front, rear, and side may be individually displayed, or the around-view image generated by the image composition ECU 120 may be displayed. Furthermore, the display 140 may respond to the setting of the shift lever 130 in "R" and may switch display of a vehicle rear image captured by the rear view camera 102 and the display of the around-view image generated by the image composition ECU 120 to display them at the same time or display one of them at a time.

An in-vehicle camera is preferably usable normally throughout the operation period of vehicles of 10 to 15 years, for example. In comparison, most of the camera apparatuses include electronic devices that implement the functions of state-of-the-art image processing technologies. There is continuous development of state-of-the-art semiconductor technology, leading to constant replacement of cameras with the latest camera apparatuses (that is, in a short period of time) on the market. That is, the development cycle of in-vehicle cameras is incompatible with the actual trend of the automobile industry in which long-term component supply such as 10 to 15 years is preferred.

It is desirable to ensure the supply of in-vehicle cameras as stable service components for occurrences of trouble or performance deterioration due to aging over the lifetime use period of the vehicle. Furthermore, it is preferable for dealers to minimize the preparation of stockpile service components for risk avoidance over the lifetime warranty period of the vehicle.

Here, conducting customization of an in-vehicle camera for individual vehicle manufacturers, vehicle models, or for individual installation locations on the same model would result in the presence of as many in-vehicle cameras as the number obtained by multiplying manufacturers by the number of models and mounting locations at maximum. In the introduction period of an in-vehicle camera, there are cases where the cameras are customized for individual vehicles due to the nature of being mounted as an option. In addition, regarding the mounting method of the in-vehicle camera and the connection harness, it is also assumed that individual mounting brackets and connection harnesses are designed for each of vehicles or each of mounting locations such as rear, front, side, or the like.

However, the burden of continuing to stockpile camera apparatuses with short development periods over the long lifetime use period of the vehicles would be excessive for dealers or the like. In a case where the in-vehicle camera is custom designed despite the limited number of vehicles sold in an identical model, a lot of resources would be needed for product distribution management or the like.

The installation of in-vehicle cameras is going to be ordinary or mandated, and that the number of shipments of in-vehicle cameras is expected to dramatically increase in the future. Therefore, the present applicants consider that it is desirable to standardize the design of in-vehicle cameras as long-term maintenance components, similarly to replacement lamps or the like, to ensure compatibility between manufacturers, between vehicles, and each of mounting locations.

In view of the above, the present specification will disclose a technology to achieve a configuration of an in-vehicle camera as a standardized compact module specializing in basic functions covering safety needs and achieving an industry standardized structure for mounting the in-vehicle camera onto the vehicle. Standardization of the in-vehicle camera and its mounting structure enables supplying in-vehicle camera as stable service components and easy replacement with new in-vehicle camera even at the occurrences of malfunction or performance degradation due to aging. Furthermore, it is possible to use in-vehicle cameras in common even for different vehicle types and manufacturers, enabling minimizing preparation as stockpiling service components. Furthermore, it is possible to replace the camera with the state-of-the-art camera system provided by the industry in each of eras.

In practice, in designing an in-vehicle camera as a standardized compact module, there are some issues such as installation tolerance (variations in the direction of the optical axis of a lens) caused by miniaturization and influence of adhesion of water droplets due to miniaturization of the lens. These points will be described in detail below.

For example, it is assumed that a compact module having a substantially cubic shape of about 20 to 25 millimeters square is used as an in-vehicle camera for the purpose of around-viewing, such as a rear camera. In installing such a compact camera apparatus, there is concern of occurrence of variations in the orientation of the camera lens with respect to the optical axis. In a case where the in-vehicle camera is not installed in a desired direction with respect to the optical axis of the lens, it also causes troubles such as displaying a video image including a tilted road surface (or with skew distortion).

To avoid this, a conventional technology often secures a casing of an in-vehicle camera to each of mounting locations of the vehicle body with screws or the like with an interposing member referred to as "brackets" so as to finely adjust the direction of the optical axis of the lens and to correct backlash between the mounting location and the casing of the in-vehicle camera (refer to Patent Documents 1 and 2, for example).

As opposed to this, the present specification will describe in detail an in-vehicle camera that can be directly mounted to a vehicle body (a plurality of mounting locations such as a front grille, a rear garnish, a mirror housing, etc.) without an interposing member such as a bracket, and a mounting structure of an in-vehicle camera arranged at the vehicle body side (predetermined mounting location such as front grille, rear garnish, mirror housing, etc.) for mounting the in-vehicle camera without using an interposing member.

Figure 2:
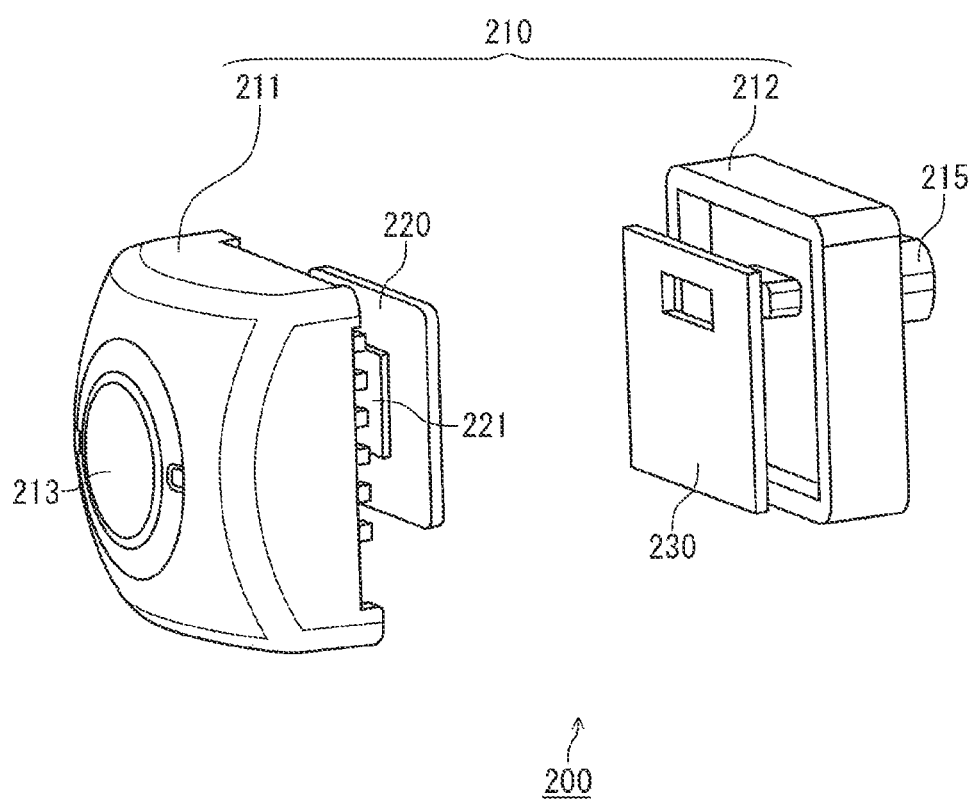
FIG. 2 is an exploded perspective view of a camera apparatus 200 as viewed from the front side.

FIG. 2 is an exploded perspective view of a state of a camera apparatus 200 according to the technology disclosed in the present specification disassembled in a direction of the optical axis of the lens as viewed from the front side. The camera apparatus 200 is used for at least one of the in-vehicle cameras 101 to 105 described above, and more desirably used for all the in-vehicle cameras 101 to 105.

A housing 210 of the substantially rectangular parallelepiped camera apparatus 200 is a structure joining a front case 211 and a rear case 212 as a front-rear pair in the optical axis direction of the lens. The front case 211 and the rear case 212 are formed into a substantially rectangular parallelepiped using a resin such as engineering plastic, for example. In addition, the front case 211 and the rear case 212 are joined together using ultrasonic welding, screws, adhesives or the like after the edges of their individual opening portions are abutted against each other. Alternatively, the front case 211 and the rear case 212 can be formed with a conductive material such as a magnesium alloy, making it possible to further enhance the blocking of undesired electromagnetic waves.

The front case 211 includes, in substantially the center of its front surface, a circular lens opening portion, and a lens 213 which is an optical light receiving surface is fitted in this lens opening portion. Although the lens 213 is specifically formed with a cylindrical lens barrel incorporating a plurality of optical lenses, a detailed description will be omitted here. In addition, a back-side edge of the front case body 211 is joined to a front-side edge of the rear case 212.

The rear case 212 has a substantially rectangular parallelepiped shape linkable with the front case 211. The rear case 212 includes, on its bottom surface, a connector plug 215 to be connected to a front substrate 220, which will be described later, and includes, on its back surface, a connector 214 serving as an electrical contact with the outside of the camera apparatus 200. The electrical contact between the camera apparatus 200 and the outside needs four to six signal lines.

The front case 211 and the rear case 212 described above are combined to form a housing 210. The housing 210 internally accommodates a front substrate 220 and a rear substrate 230. Note that the rear substrate 230 is not necessarily to be provided, and the camera may have a circuit configuration established with one substrate.

The front substrate 220 is formed with a printed circuit board having an imaging element 221 mounted on the front side and having one or more circuit chips (not illustrated) mounted on the back side. For example, it is allowable to use, as the imaging element 221, an image sensor such as a charge coupled device (CCD) or a complementary metal oxide semiconductor (CMOS). Furthermore, the imaging element 221 may be a backside illumination type image sensor. In addition, the circuit chip mounted on the back side of the front substrate 220 includes a drive circuit for driving the imaging element 221, an electronic control unit (ECU) that performs signal processing of the captured image and performs processing of transmitting image data that has undergone signal processing to the outside (described above), and the like. Note that the application target of the technology disclosed in the present specification is not limited to the configuration having the imaging element 221 and the circuit chip individually mounted on the substrate of the front substrate 220. For example, the technology disclosed in the present specification can be similarly applied to a stacked image sensor in which the imaging element 221 and a circuit chip are integrally formed.

The printed circuit board constituting the front substrate 220 is a rigid structure having a substantially rectangular shape. The front substrate 220 arranges the imaging element 221 to face the lens 213 disposed at the back side of the front case 210 so as to adjust the focus of the lens 213 (focus alignment). Note that while the illustrated example is a case where the front substrate 220 includes one substrate, the front substrate 220 may be formed by combining two or more substrates.

Furthermore, the front substrate 220 that has completed lens and optical axis alignment and has been mounted on the front case and the rear substrate 230 are included as a camera substrate, and this camera substrate is sealed with the rear case 212. The front case 211 and the rear case 212 are airtightly sealed to each other by adhesive, screw, ultrasonic welding or the like.

Figure 3:
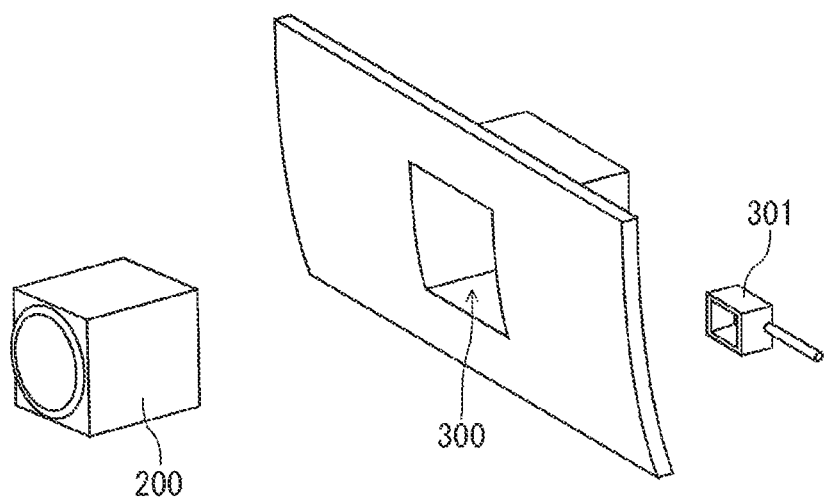
FIG. 3 is a view illustrating an opening for accommodating a camera apparatus formed on the vehicle body side.

FIG. 3 illustrates an opening 300 formed on the vehicle body side to accommodate the camera apparatus 200. Basically, the opening 300 has a shape and dimension compatible with the outer shape of the camera apparatus 200. The camera apparatus 200 is inserted into the opening 300 so as to be mounted on the vehicle. The camera apparatus 200 is an in-vehicle camera used in a state mounted on a vehicle, and the opening 300 is arranged at mounting locations of an in-vehicle camera on the vehicle body side, such as a front grille, a rear garnish, and a mirror housing. Furthermore, the bottom surface of the opening 300 includes a connector receptacle 301 to be joined with the connector plug 215 (described above) disposed on the back side of the camera apparatus 200. The connector plug 215 and the connector receptacle 301 are combined to form a single connector. FIG. 3 is a perspective view of a state where the camera apparatus 200 is inserted into the opening 300.

The opening 300 is formed in a member such as a front grille, a rear garnish, and a mirror housing. Since these member are large components, the precision of the mold used for manufacturing these components is lowered roughly one order of magnitude with respect to the precision of the precision components used in the camera. Conventionally, the in-vehicle camera is attached to the vehicle body via a member such as a bracket so as to ensure the accuracy in the mounting direction of the in-vehicle camera (as described above).

However, in a case where installation or replacement of the in-vehicle camera is performed via an interposing member, and when the strength of the interposing member is sufficient and the tolerance accuracy of the mounting orientation of the miniaturized vehicle-mounted camera is not ensured, there might be cases where in-vehicle camera is secured in an unintentional direction of the optical axis of the lens, or the mounting position cannot be defined, causing fluctuation in the mounting orientation. In a case where the driver views the image captured by the in-vehicle camera mounted in such a state, there is a risk of taking an erroneous steering direction, extremely dangerous from the viewpoint of safety.

In particular, backward movement of a vehicle is often performed in a small space such as a garage, and the driver mainly makes judgment on the basis of a video image captured by the rear camera. Accordingly, fluctuations in the mounting direction of the rear camera would cause erroneous steering, which is not preferable. That is, even in a case where a miniaturized in-vehicle camera is going to be mounted on a large component manufactured with rough-precision molds, such as front grille, rear garnish, and mirror housing, capability of alignment as a precision component would be preferred.

Meanwhile, when the diameter of the lens 213 as an optical light receiving surface is miniaturized together with miniaturization of the main body of the camera apparatus 200, the diameter of water droplets that adhere to the optical surface (the surface of the lens 213) in rain, etc., becomes relatively closer to the effective diameter of the lens 213. Generally, it is assumed that the optical surface of the lens 213 undergoes water repellent treatment. However, there might be cases where the water repellency is lowered due to degradation of water repellent treatment over time or adhesion of dirt or the like and water droplets spread over substantially the entire effective optical surface.

Figure 4:
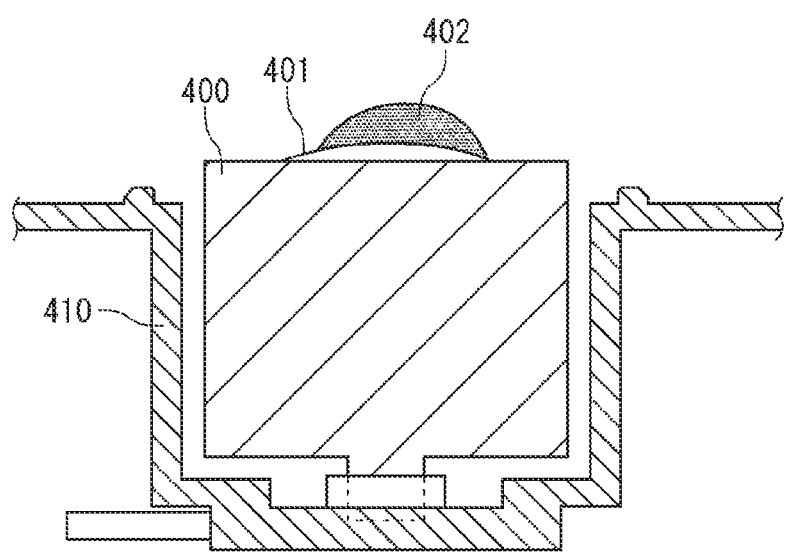
FIG. 4 is a view illustrating a state in which water droplets cover an optical surface of the camera.

FIG. 4 illustrates a state in which water droplets cover the optical surface of the camera. However, it is assumed that the illustrated camera 400 is accommodated as an in-vehicle camera in an opening 410 of the vehicle body. Together with miniaturization of the camera 400, the lens (or optical window) 401 is also miniaturized. As a result, a water droplet 402 adhering to the surface of the lens 401 has a relatively large proportion with respect to the lens effective diameter, leading to a state where the viewing angle of the camera 400 is covered widely with a single particle of the water droplet 402. That is, when the effective diameter of the optical surface is small, adhesion of a single particle of water droplet would cover the entire captured image of the camera 400 with high probability. Under such circumstances, the distortion in the captured image caused by the water droplet 402 would not only influence a local region but affect the entire image such that the image appears to be zoomed, or the appears to be horizontally shifted. Furthermore, since the boundary of the water droplet 402 would not appear in the captured image of the camera 400, distortion or image shift appears to the observer (such as a driver) depending on the situation when water droplets are adhered. This might even change the viewing field direction or the like of the image seen with no water droplets, leading to misrecognition of the direction of the target. In an image simultaneously displayed with a guide line depicting the traveling direction by signal processing in particular, the background image alone would be shifted with the guide line not having been influenced by the water droplet, leading to misrecognition.

Furthermore, as illustrated in FIG. 4, in a state where a single water droplet 402 adheres to the lens 401, the water droplet 402 functions as a conversion lens (convex lens). In addition, the lens characteristics from the predetermined design magnification of the original lens 401 might be changed to allow the water droplets to influence on the entire captured image of the camera 400. This might result in a state where the captured image horizontally shifts or the droplet functions like zooming lens and might change viewing ranges and directions. Such an abnormal state of the image is a relative change such as a change in the magnification and a deviation of the image, and thus, an observer such as a driver might overlook such abnormality. In a case where the driver continues to steer the vehicle with wrong recognition of the abnormal image as a normal image, the driver might make a mistake in the steering.

In short, a miniaturized lens of the camera leads to a relatively larger proportion of one particle of water droplet adhering to the surface of the lens with respect to the effective diameter of the lens. Specifically, when the effective diameter of the lens becomes ten and several millimeters or less, the viewing angle of the camera is covered widely with only one water droplet, causing the influence of the water droplet to appear on the entire screen of a view monitor, or the like.

Furthermore, a lens exposed to the outside of the camera like an in-vehicle camera need waterproof treatment to prevent entry of moisture into the camera. For example, in cold climates such as North America and Northern Europe, de-icing agent sprayed on the road surface adheres to the vehicle body, leading to the use of washing water with high temperature and high pressure exceeding 100 degrees to be blown to the vehicle at the time of car wash. Accordingly, waterproof measures against high pressure wash water would also be needed for in-vehicle cameras as well.

For example, in a case where an elastic waterproof packing such as an elastomer member is sandwiched between an optical lens member and a camera lens barrel member to implement a waterproof treatment, it would be preferable to screw a ring-shaped pushing member to crush the waterproof packing so as to ensure resistance against water pressure. For example, a screw structure is provided outside the optical effective diameter of the lens, and the waterproof packing is sandwiched by a ring-shaped push-in screw. Miniaturizing the entire camera while adopting such a waterproof structure would further reduce the effective diameter permitted as a lens. This might make the above-described influence given by the water droplets adhering to the surface of the lens on the captured image of the camera further remarkable.

In contrast, separating the water droplet adhesion surface away from the lens or optical window of the camera would reduce the proportion of one particle of water droplet with respect to the lens effective diameter (or the entire captured image of the camera), or would suppress the state where the entire screen of a view monitor, etc. is covered with a single water droplet, and instead would allow a plurality of water droplets to appear. This enables the presence of water droplets on the screen to be apparent, allowing the observer such as the driver to visually recognize the presence of water droplets by visual observation of the image. This leads to achievement of effective prevention of misrecognition and erroneous steering of the vehicle accompanying the misrecognition.

Figure 5:
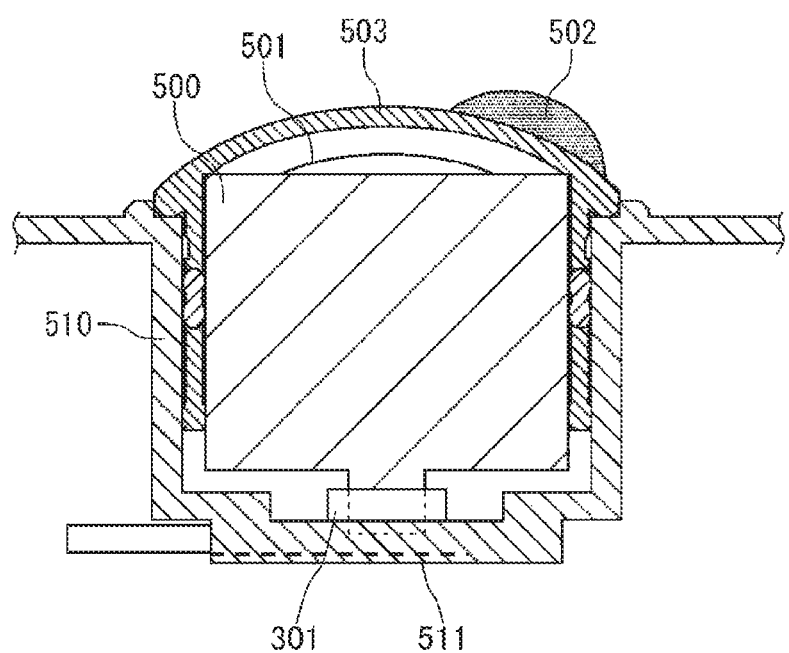
FIG. 5 is a view illustrating a state in which a transparent optical protection window cover is attached to the front of the optical surface of the camera.

The present specification proposes, as one means for separating the water droplet adhesion surface from the camera lens or the optical window, as illustrated in FIG. 5, installation of a transparent optical protection window cover 503 at a portion in front of a lens (or optical window) 501 of a camera 500. This optical protection window cover 503 is inserted into the opening 510 on the vehicle body side together with the camera 500 main body.

As observed from FIG. 5, the water droplet 502 attached to the surface of the optical protection window cover 503 is separated from the lens 501 of the camera 500. This suppress adhesion of water droplets to the surface of the lens 501 and achieves reduction in the proportion of the water droplet 502 adhered to the surface of the optical protection window cover 503 with respect to the viewing angle (in other words, the entire captured image) of the camera 500, or allows the water droplet in the captured image of the camera 500 displayed on a view monitor or the like to be divided into a plurality of water droplets. This enables the presence of water droplet 502 on the screen to be apparent, allowing the observer such as the driver to visually recognize the presence of the water droplet 502 by visual observation of the image. This leads to achievement of effective prevention of misrecognition and erroneous steering of the vehicle accompanying the misrecognition. Basically, the screen displaying the captured image of the camera 500 might include the image partially disturbed due to the water droplet and sometimes not perfect for observation. Still, the driver would thus carefully try to grasp what appears in the image at the time of image recognition, leading to assurance of security.

Figure 7:
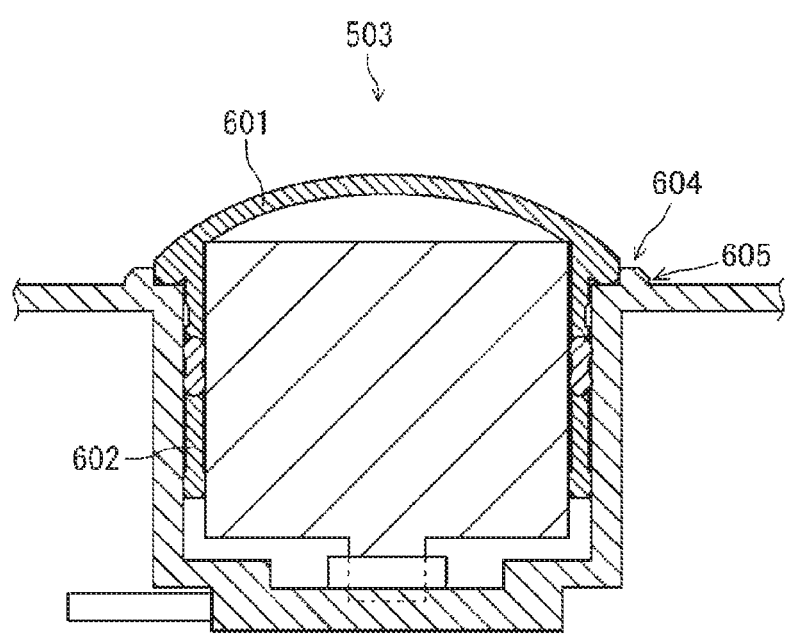
FIG. 7 is a cross-sectional view illustrating a state in which the optical protection window cover is attached to the surface of a camera inserted in the vehicle body.

FIG. 6 is a cross-sectional view of a state before the optical protection window cover 503 is attached to the surface of the camera 500 inserted in the vehicle body (a state where the optical protection window cover 503 is separated from the camera 500 and the opening 510). In contrast, FIG. 7 illustrates a state where the optical protection window cover 503 is attached to the surface of the camera 500 inserted in the vehicle body.

The optical protection window cover 503 includes a head 601 for protecting the lens or optical window of the camera and a cylindrical body 602 mounted to the opening of the vehicle body and configured to accommodate the camera main body.

The head 601 has a spherical shape and is disposed to be separated from the lens or the optical window of the camera apparatus. Accordingly, as compared with the case where water droplets adhere to the surface of the lens or the optical window of the camera apparatus, the proportion of water droplets adhered to the surface of the head 601 with respect to the viewing angle (in other words, the entire captured image) of the camera is smaller.

The body 602 molded with a precise mold has a hollow or cylindrical shape for internally accommodating the camera. As illustrated in FIG. 7, the body 602 is inserted into the gap between the camera and the opening of the vehicle body into which the camera is inserted. In addition, it can be said that insertion of the body 602 would allow the camera to be firmly mounted to the opening of the vehicle body. Furthermore, mounting the camera to the opening of the vehicle body via the body 602 would make it possible to obtain a high mounting accuracy in the optical axis direction of the camera. This makes it possible to mount the camera to the vehicle body with the optical axis of the lens set in a desired direction, it is possible to suppress an undesirable situation such as displaying a video image with an inclined road (or skewed distortion) on the screen.

As illustrated in FIGS. 6 and 7, the entire optical protection window cover 503 is a molded article including an acrylic resin or the like having an inverted U-shaped cross section. The optical protection window cover 503 can also be functionally referred to as a "jacket" for the camera body from the viewpoint of covering, using its body 602, the side surface of the camera apparatus main body and implementing positional alignment of the camera apparatus.

Furthermore, the body 602 includes, at its middle portion in the depth direction, a waterproof ring 603 including an elastomer or the like, with waterproof treatment to prevent entry of water deep into the camera mounted to the opening. When the body 602 is inserted into the gap between the camera apparatus main body and the opening of the vehicle body, the waterproof ring 603 is crushed to ensure resistance to water pressure. For example, in cold climates such as North America and Northern Europe, high temperature and high pressure washing water exceeding 100 degrees is sprayed at the time of car washing in order to remove de-icing agent attached to the vehicle body, and thus, it is important to ensure resistance to water pressure.

While the waterproof ring 603 may have a simple shape of a circle or an ellipse, it is possible, as illustrated in the drawing, to provide a double waterproof structure having a constricted part near the center, thereby dispersing water pressure at the bulging portions at both ends of the constriction and reliably stopping the water flow at the bulging portion of the second stage (deeper side).

Figure 15:
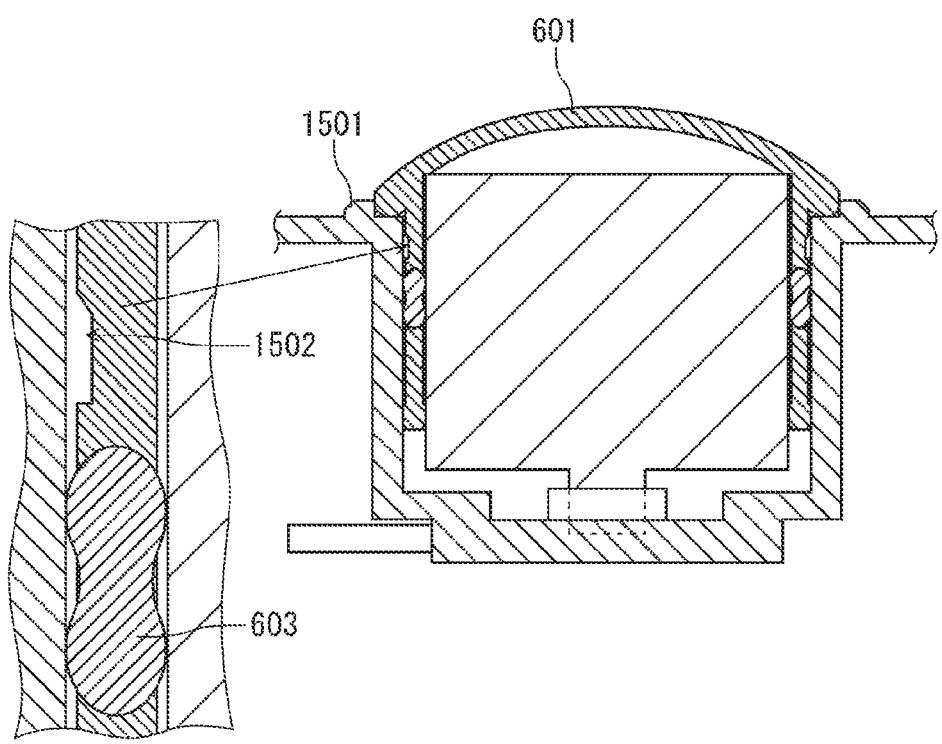
FIG. 15 is an enlarged view illustrating a structure around a waterproof ring.

FIG. 15 is an enlarged illustration of a structure around the waterproof ring 603. A mechanism of waterproofing will be described in detail with reference to the figure.

In the opening of the vehicle body, a linear protrusion 1501 may be formed along the outline of the head 601 of the optical protection window cover 503. For example, it is assumed that a high-pressure water stream is blown to the vicinity of the boundary between the head 601 and the opening when the vehicle body undergoes high pressure washing. With the presence of the protrusion 1501, it is possible to avoid entry of the high-pressure water flow into the opening from the boundary between the head 601 and the opening.

Furthermore, the optical protection window cover 503 includes an influent trap 1502 including linear grooves in a waist direction on the front side of the waterproof ring 603 (or on the side close to the opening portion of the vehicle body), on the body 602. The boundary gap between the head 601 and the receiving hole opening 510 is narrow. Accordingly, even when a high pressure water flow enters from one location of the boundary 604 between the opening 510 and the protrusion 1501, the water flow that has reached the influent trap 1502 loses its velocity at a bent flow path and is dispersed in the waist direction so as to alleviate the water pressure. This would make it possible to suppress further entry of the water current into a deeper portion. Particularly, forming a rising wall 605 (the protrusion 1501) in the vicinity of the boundary line 604 while minimizing the shape of the recess around the opening 510 would be able to change the flow path of the high pressure wash water blown to the peripheral portion, leading to acquisition of an effect of reducing the inflow pressure of the water flow into the gap.

The waterproof ring 603 may be formed in an elastomer member, for example, and may have a double waterproof structure having a constricted part near the center, thereby dispersing water pressure at the bulging portions at both ends of the constriction and reliably stopping the water flow at the bulging portion of the second stage (deeper side). Furthermore, even when the low-pressure water enters temporarily from the influent trap 1502 in front, the pressure is stabilized at the first stage portion of the waterproof ring 603. Accordingly, there is substantially no possibility of flowing beyond the second stage, leading to assurance of waterproof.

Furthermore, as illustrated in the drawing, with a configuration of the waterproof ring 603 in a shape having a long cross section in the axial direction of the ring (or the longitudinal direction of the body 602), it is possible to eliminate the shape instability and avoid, for example, failure in waterproof due to twisting of the ring, having a secondary effect of suppressing the reduction of yield, or the like.

Features regarding the mounting of the optical protection window cover illustrated in FIG. 6 and FIG. 7 will be summarized below.

(1) The optical protection window cover is disposed so as to be separated from the lens of the camera or the optical window. With this configuration, it is possible to reduce the proportion of the water droplets adhering to the optical protection window cover with respect to the viewing angle of the camera (or the entire screen of a view monitor or the like).

(2) The optical protection window cover is constructed as a component which can be replaced with respect to the camera and the opening of the vehicle body. Openings constructed as portion of large components (front grille, rear garnish, mirror housing, etc.) can only be molded with general tolerances. In contrast, since the optical protective cover is a small component, it can be precisely molded.

(3) The optical protection window cover is configured as a mounting and fixture structure used as a lock jacket for securing the camera to the opening of the vehicle body. While it is difficult to form an opening with high precision in the vehicle body, providing a precise lock structure with a lock jacket makes it possible to ensure a high mounting accuracy in the optical axis direction of the camera. This makes it possible to mount the camera to the vehicle body with the optical axis of the lens set in a desired direction, it is possible to suppress an undesirable situation such as displaying a video image with an inclined road (or skewed distortion) on the screen.

(4) Adopting a POP rivet (trade name of Nippon POP Rivets and Fasteners Co. Ltd.) and other two-step lock structure in the lock jacket structure for securing the camera with the optical protection window cover makes it possible to ensure the stable holding performance of the camera apparatus. This structure is just like a mechanism to open a puzzle box, using a mechanism to unlock in two steps. Furthermore, the use of configuration to be unlocked only from inside of the vehicle body, such as when the trunk is opened, would make it possible to enhance the effect of preventing the theft of removing the camera apparatus from the vehicle body.

(5) With a configuration of closely adhering the waterproof elastomer member to the middle portion of the body of the optical protection window cover, it is possible to improve the handling property at the time of manufacture and the yield by eliminating alignment instability as well as reduce disadvantageous situations.

The optical protection window cover 503 illustrated in FIGS. 5 to 7 includes: a hollow or cylindrical body 602 covering the side surface of the camera apparatus main body; and a head 601 covering the front surface of the camera apparatus and arranged to be separated from the lens or the optical window. As described above, the head 601 plays a role of reducing the proportion of water droplets with respect to the entire captured image of the camera when the head 601 moves water droplets attached to the surface away from the lens or optical window of the camera apparatus. Meanwhile, there is also another use case including no adverse effect of water droplets, and where it is not necessary to protect the lens or optical window of the camera apparatus from water droplets, and thus it is sufficient as long as the camera apparatus can be mounted with high accuracy.

Figure 8:
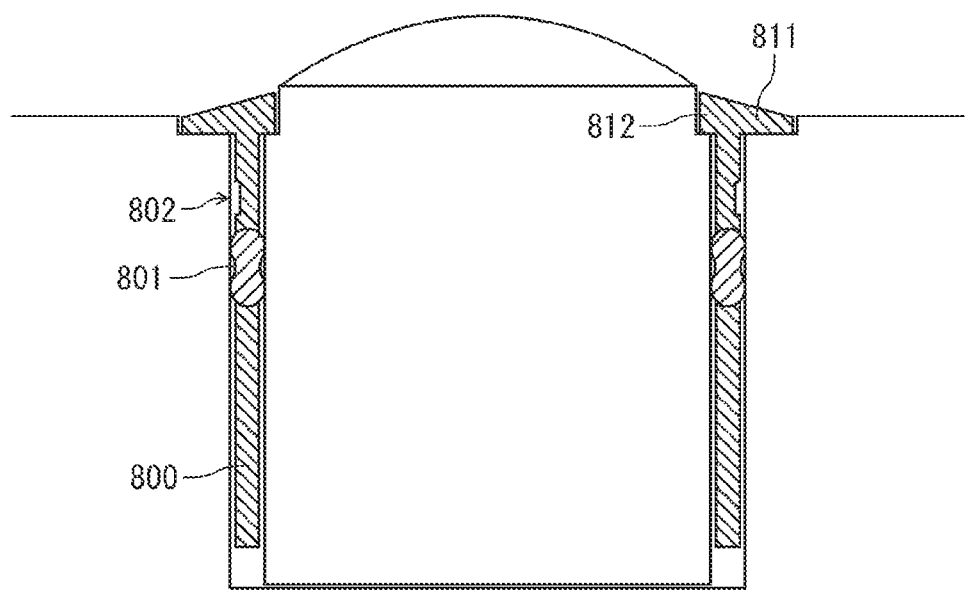
FIG. 8 is a view illustrating a modification of a lock jacket of the camera apparatus.

FIG. 8 illustrates a modification of the lock jacket of the camera apparatus. The figure illustrates a cross section of a lock jacket 800 attached to the opening of the vehicle body together with the camera apparatus. The illustrated lock jacket 800 is constituted simply by a hollow or cylindrical body covering the side surface of the camera apparatus main body and does not include a head covering the lens or the optical window of the camera apparatus. Therefore, the lock jacket 800 can just provide a lock structure that secures the camera apparatus to the opening of the vehicle body with high mounting accuracy, without a function of reducing the proportion of water droplets with respect to the entire captured image of the camera.

In a case where there is substantially no adverse effect of water droplets and it is not necessary to protect the lens or optical window of the camera apparatus from water droplets, it is sufficient to use a lock jacket (without a protective window cover) as illustrated in FIG. 8 to implement a high-accuracy mounting structure of the camera apparatus rather than using an optical protection window cover (provided with a lock jacket structure). Examples of the case where there is no adverse effect of water droplets include a case of an in-vehicle camera mounted on a vehicle that is supposed to travel in a region with less rainfall, a case where the effective diameter of the lens is not small and thus it is not probable that adhesion of one water droplet would cover the entire captured image, or the like.

Note that the lock jacket 800 includes, at its middle portion in the depth direction, a waterproof ring 801 including an elastomer or the like, with waterproof treatment to prevent entry of water deep into the opening of the vehicle body. When the lock jacket 800 is inserted into the gap between the camera apparatus main body and the opening of the vehicle body, the waterproof ring 801 is crushed to ensure resistance to water pressure. Furthermore, an influent trap 802 is formed in front of the waterproof ring 801.

In the configuration example illustrated in FIG. 8, a mechanism for securing the camera apparatus in the opening by the lock jacket 800 and locking the camera apparatus at the mounting position will be additionally described.

As illustrated in the drawing, the cross section of the lock jacket 800 has a substantially T-shaped upper end edge. The vertical portion of the T-shape corresponds to a portion of the cylinder covering the side surface of the camera apparatus main body. Furthermore, the horizontal portion of the T-shape protrudes toward the outside and the inside of the opening of the vehicle body.

The protrusion 811 protruding to the outside of the horizontal portion of the T-shape abuts against the edge portion of the opening on the vehicle body side to hold the lock jacket 800 so as not to be excessively inserted deep into the opening. Furthermore, the protrusion 812 protruding inward of the horizontal portion of the T-shape abuts against the upper side edge of the camera apparatus main body. As illustrated in the drawing, a notch may be formed on the upper side edge of the camera apparatus main body so as to engage with the protrusion 812 toward the inner portion of the horizontal portion of the T-shape.

The camera apparatus is held by the protrusion 812 on the horizontal portion of the T-shape in a state where the lock jacket 800 is attached, and thus, the camera apparatus cannot rise from the opening on the vehicle body side. Therefore, in a case where the lock jacket 800 is secured at a position in the opening, the camera apparatus is locked by the lock jacket 800 and cannot be removed from the opening. FIG. 8 omits illustration of a lock structure for locking the lock jacket 800 to the opening of the vehicle body. The use of configuration of the lock structure to be unlocked only from inside of the vehicle body, such as when the trunk is opened, would make it possible to enhance the effect of preventing the theft of the camera apparatus from the vehicle body.

Figure 9:
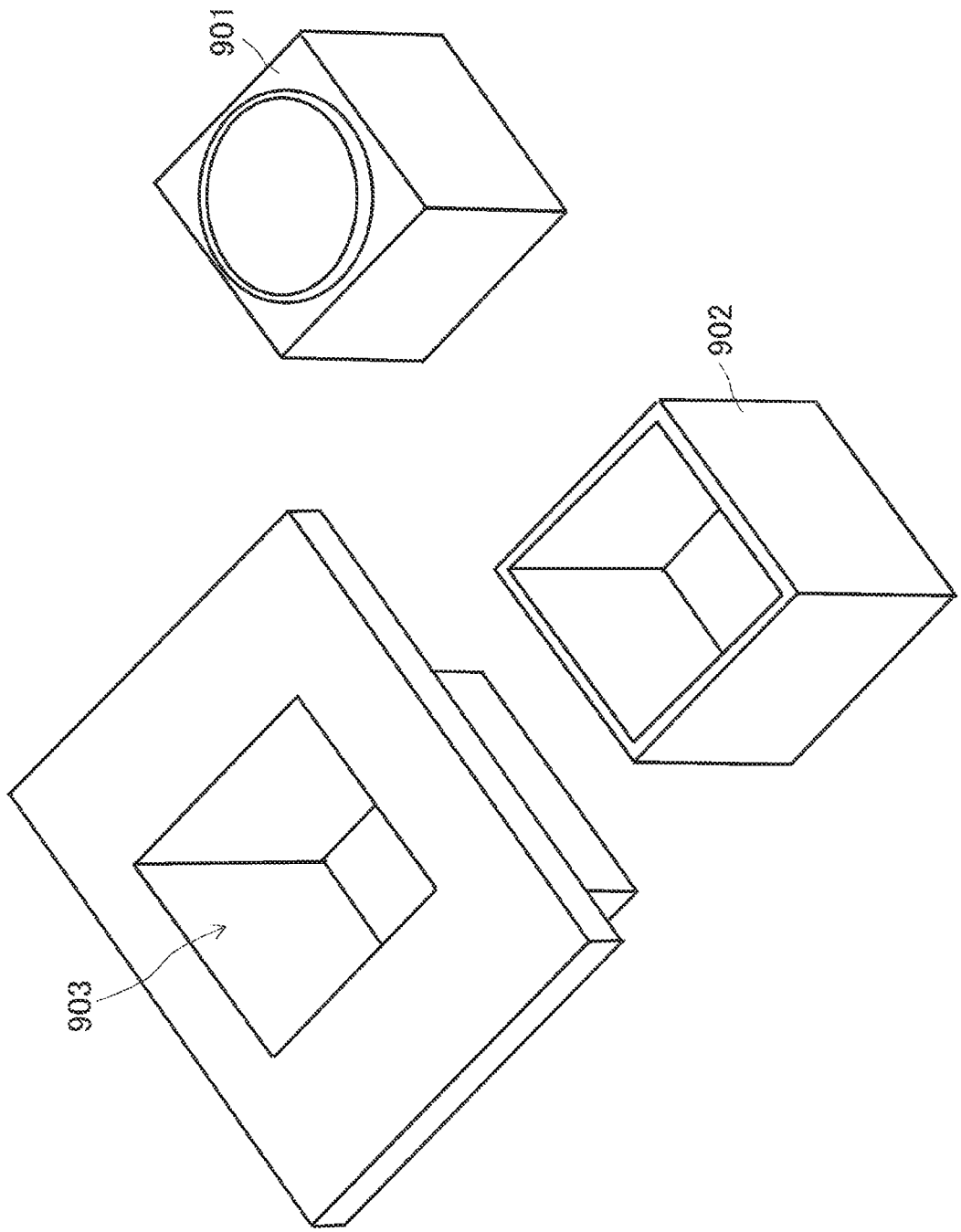
FIG. 9 is a perspective view illustrating a state in which the camera apparatus and the lock jacket are removed from the opening on the vehicle body side.

FIG. 9 illustrates a state in which a camera apparatus 901 and a lock jacket 902 are removed from an opening 903 on the side of the vehicle body. Note that, for the sake of convenience, FIG. 9 schematically illustrates the camera apparatus 901 as a cube, the lock jacket 902 as a hollow outer frame covering the cube, the opening 903 as a recess having a shape capable of inserting the cube with the outer frame, individually as simplified shapes.

The opening 903 is a recess (socket) for inserting the camera apparatus 901 which is molded in the vehicle body (front grille, rear garnish, mirror housing, etc.). Although the opening 903 has an electrical contact with the camera apparatus 901 on the bottom surface or the side surface, the contact is not illustrated in FIG. 9.

The opening 903 is a part of a large component such as a front grille, a rear garnish, a mirror housing, and can only be molded by general tolerance. The accuracy of the mold used for manufacturing these components is lowered roughly one order of magnitude with respect to the accuracy of the precision components used in the camera. Therefore, in a case where the camera apparatus 901 is directly mounted to the opening 903 of the vehicle body, it is extremely difficult to ensure the tolerance accuracy of the mounting direction of the camera apparatus 901 enabling the optical axis of the lens to be set in the intended direction. In a case where the driver views, on a view monitor screen in the car, the image captured by the camera apparatus 901 mounted in such a state, there is a risk of taking an erroneous steering direction, extremely dangerous from the viewpoint of safety.

In contrast, in the present embodiment, the opening 903 out of the vehicle body has a configuration using a nested structure created with higher precision separately from the sites forms as a large component in a part of the mold for molding the vehicle body. With this configuration, it is possible to restrictedly enhance molding accuracy of the opening 903 out of the vehicle body in the camera mounting direction, leading to enhancement of the mounting accuracy of the camera in the opening 903. In addition, the camera apparatus 901 is enclosed by the lock jacket 902 and is mounted to the opening 903. The lock jacket 902 is a small component, and thus, can be formed by precision molding. Therefore, it is easy to ensure the tolerance accuracy of the mounting direction of the camera apparatus 901 so as to set the optical axis of the lens to be in the intended direction. In a case where the driver views, on a view monitor screen in the car, the image captured by the camera apparatus 901 mounted in such a state, the risk of taking an erroneous steering direction would be low, which is preferable from the viewpoint of safety.

In short, the lock jacket 902 is a precision-molded camera securing jacket for implementing positional alignment of the camera apparatus 901. Note that although not illustrated in FIG. 9, a belt-like waterproof elastomer may be integrally formed on the outer periphery of the lock jacket 902 (or the waterproof elastomer may be a separate component from the lock jacket 902), so as to provide the camera apparatus 901 with a waterproof function (preventive measures against water inflow to the opening 903).

The optical protection window cover illustrated in FIGS. 5 to 7 is a structure having an inverted U-shaped cross section and having a head covering the lens or the optical window of the camera apparatus. In other words, the optical protection window cover has a structure in which the head is closed. For this reason, as illustrated in FIGS. 6 and 7, there is a need to attach the camera apparatus and the optical protection window cover to the opening of the vehicle body in this order, and it is not possible to mount the camera apparatus after attaching the optical protection window. In contrast, the lock jacket illustrated in FIGS. 8 and 9 has an opening in the head. Accordingly, it is possible to configure such that the lock jacket is first inserted and then the camera apparatus is inserted, rather than the order of the camera apparatus and the lock jacket.

FIG. 10 illustrates a specific configuration example of a lock mechanism of a lock jacket 1000. The upper part of the drawing illustrates a cross sectional configuration when a camera apparatus 1020 is attached to an opening 1010 of the vehicle body together with the lock jacket 1000. Furthermore, the lower part of the drawing illustrates top view of the opening 1010 of the vehicle body in a state where the camera apparatus 1020 is attached together with the lock jacket 1000 (the upper part of the drawing is a cross-sectional view taken along line A-A'). The illustrated lock jacket 1000 does not include a head covering the lens of the camera apparatus or the optical window, and includes a waterproof ring 1001 including an elastomer or the like disposed at an intermediate portion in the depth direction of the body (same as above).

There is provided a latch unit 1002 protruding at a position of the lower edge of the outer side surface of the hollow lock jacket 1000. Meanwhile, a wall surface of the opening 1010 of the vehicle body includes a recess, namely, a fitting portion 1011 having a shape and dimension suitably engaging with the latch unit 1002, at a portion corresponding to the latch unit 1002. As will be described later, the latch unit 1002 is fitted to the fitting portion 1011, whereby the lock jacket 1000 is secured to the opening 1010 of the vehicle body.

Furthermore, there is also a latch unit 1003 protruding substantially at the center of the inner surface of the hollow lock jacket 1000. Meanwhile, a side wall surface of the camera apparatus 1020 includes a recess, namely, a fitting portion 1021 having a shape and dimension suitably engaging with the latch unit 1003, at a portion corresponding to the latch unit 1003. As will be described later, the latch unit 1003 is fitted to the fitting portion 1021, whereby the camera apparatus 1020 is secured to the lock jacket 1000.

In summary, with the double lock structure in which the latch unit 1002 of the lock jacket 1000 is fitted to the fitting portion 1011 of the opening 1010 while the latch unit 1003 of the lock jacket 1000 is fitted to the fitting portion 1021 of the camera apparatus 1020, the camera apparatus 1020 is secured to the opening 1010 of the vehicle body together with the lock jacket 1000, and is brought into a locked state.

Since the vehicle body is a large-sized part, it has only to perform molding with general tolerance, and it is roughly about one order of magnitude to the precision of the precision components used for the camera. In contrast, the opening 1010 out of the vehicle body has a configuration using a nested structure created with higher precision separately from the sites forms as a large component in a part of the mold for molding the vehicle body. With this configuration, it is possible to restrictedly enhance molding accuracy of the opening 1010 out of the vehicle body in the camera mounting direction, leading to enhancement of the mounting accuracy of the camera in the opening 1010. In addition, since the lock jacket 1000 is a small component, it can be precisely molded. This makes it possible to secure a high mounting accuracy of the camera apparatus 1020 in the optical axis direction. This enables mounting the camera apparatus 1020 to the vehicle body with the optical axis of the lens set in a desired direction, leading to suppression of an undesirable situation such as displaying a video image with an inclined road (or skewed distortion) on a monitor screen.

An operation procedure for attaching the camera apparatus 1020 and the lock jacket 1000 to the opening 1010 of the vehicle body will be described with reference to FIGS. 11 to 14.

Figure 11:
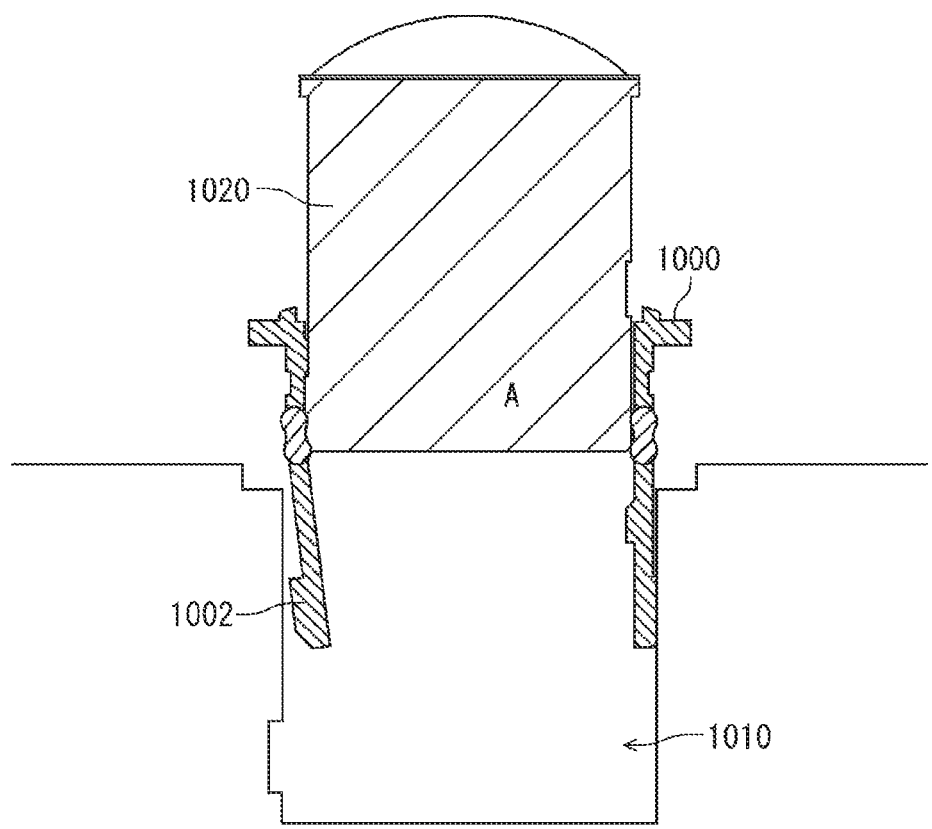
FIG. 11 is a view illustrating an operation procedure for mounting the camera apparatus and the lock jacket to the opening of the vehicle body.

First, as illustrated in FIG. 11, the camera apparatus 1020 is inserted about half way to the lock jacket 1000, and insertion of this lock jacket 1000 to the opening 1010 of the vehicle body is started. The lower edge portion of the lock jacket 1000 where the latch unit 1002 protrudes has a greater wall thickness and thus is slightly larger than the dimension of the inner periphery of the opening 1010. However, the lock jacket 1000 can be inwardly bent to be deformed at a portion where the latch unit 1002 protrudes in a state where the camera apparatus 1020 is not completely inserted. This makes it possible to further insert the lock jacket 1000 deeper of the opening 1010.

Figure 12:
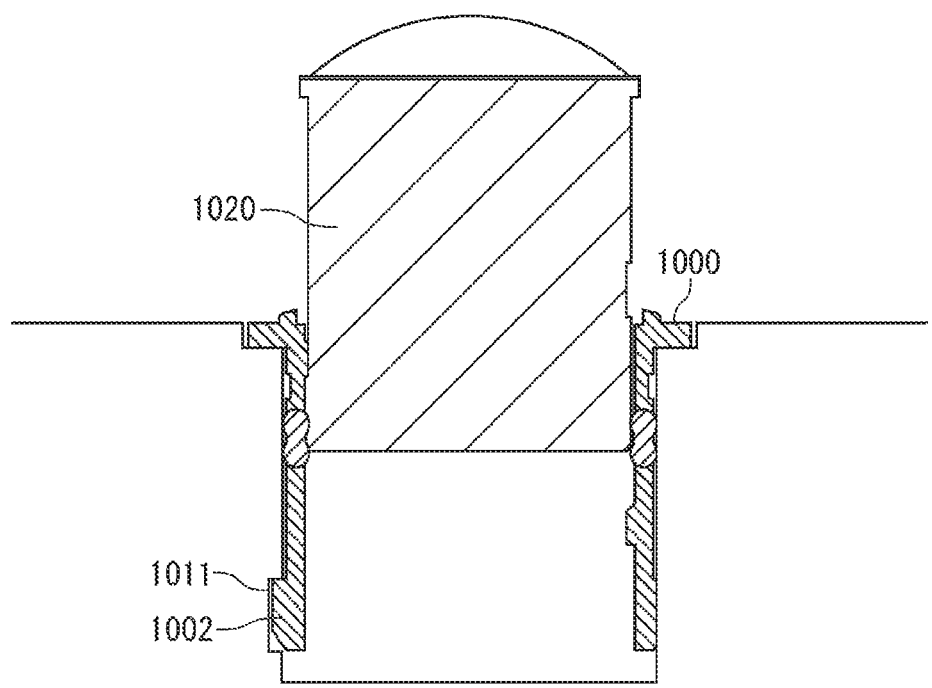
FIG. 12 is a view illustrating an operation procedure for mounting the camera apparatus and the lock jacket to the opening of the vehicle body.

Subsequently, when the latch unit 1002 reaches the fitting portion 1011 formed on the wall surface near the bottom of the opening 1010, the latch unit 1002 is engaged with the fitting portion 1011 and the lock jacket 1000 restores from the deformed state to the original state, as illustrated in FIG. 12. Furthermore, the lock jacket 1000 is retained with the opening 1010 so as to complete attachment of the lock jacket 1000 to the opening 1010. However, at this point in time, the camera apparatus 1020 is in a state being half inserted to the lock jacket 1000 (as well as the opening 1010).

Figure 13:
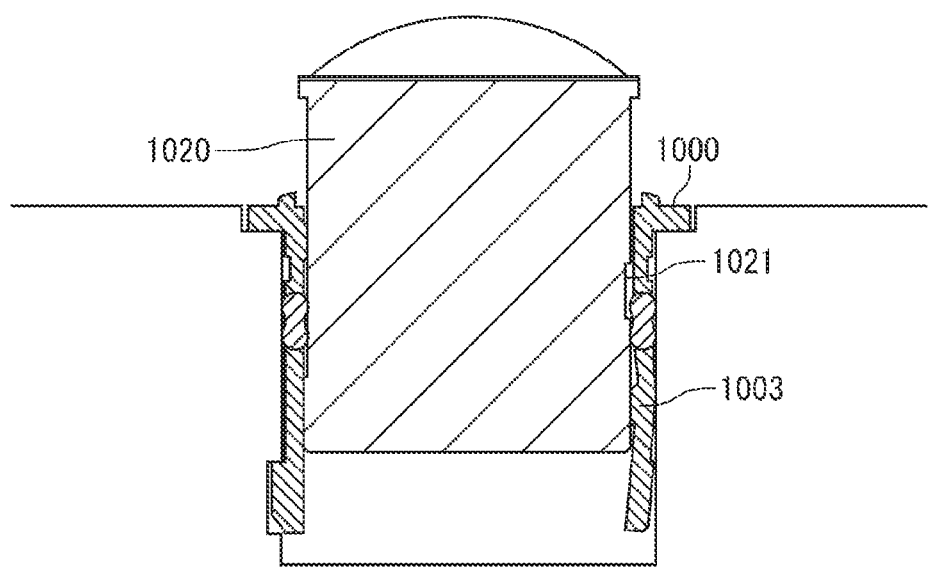
FIG. 13 is a view illustrating an operation procedure for mounting the camera apparatus and the lock jacket to the opening of the vehicle body.

After completion of attachment of the lock jacket 1000 to the opening 1010, the camera apparatus 1020 is inserted further deep into the lock jacket 1000 (and the opening 1010). Since the portion of the hollow lock jacket 1000 where the latch unit 1003 protrudes at an approximate center of the inner surface has a greater wall thickness, and thus is slightly smaller than the outer dimension of the camera apparatus 1020. Accordingly, as illustrated in FIG. 13, the camera apparatus 1020 is inserted further into the opening 1010 while slightly bending outward in the vicinity of the latch unit 1003 of the lock jacket 1000.

Figure 14:
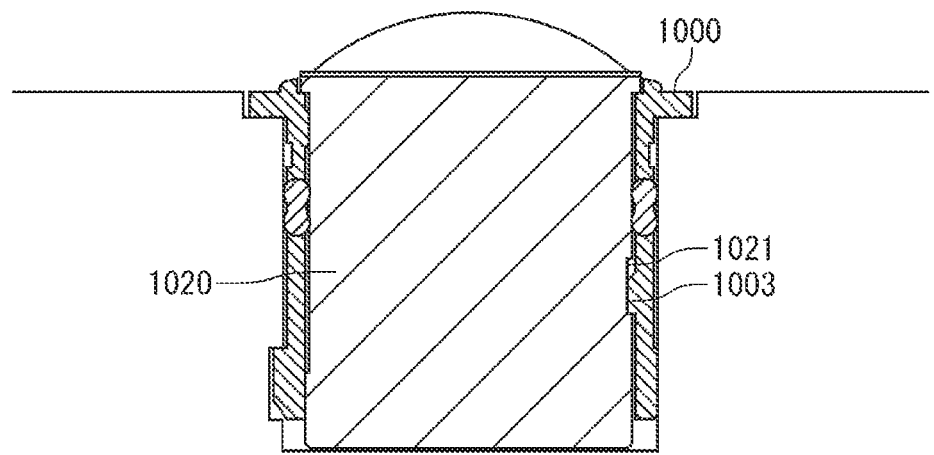
FIG. 14 is a view illustrating an operation procedure for mounting the camera apparatus and the lock jacket to the opening of the vehicle body.

In addition, when the fitting portion 1021 formed on the side wall surface of the camera apparatus 1020 reaches the latch unit 1003 of the lock jacket 1000, the latch unit 1003 is engaged with the fitting portion 1021 to allow the lock jacket 1000 to be restored from the bent state to the original state, as illustrated in FIG. 14. Furthermore, the camera apparatus 1020 is retained with the lock jacket 1000 so as to complete attachment of the camera apparatus 1020 to the lock jacket 1000. Completion of the attachment of the lock jacket 1000 to the opening 1010 represents completion of the attachment of the camera apparatus 1020 to the lock jacket 1000, being locked to the opening 1010 of the vehicle body.

In this manner, here completed is double lock operation in which the latch unit 1002 of the lock jacket 1000 is fitted to the fitting portion 1011 of the opening 1010 of the vehicle body while the latch unit 1003 of the lock jacket 1000 is fitted to the fitting portion 1021 of the camera apparatus 1020. With reference to FIG. 10 and FIG. 14, it is observed that it is difficult, with such a double lock structure, to perform crime prevention of pulling the camera apparatus 1020 from the outside of the vehicle body. The use of configuration of the double lock structure to be unlocked only from inside of the vehicle body, such as when the trunk is opened, for example, would make it possible to enhance the effect of preventing the theft of the camera apparatus from the vehicle body.

Figure 16:
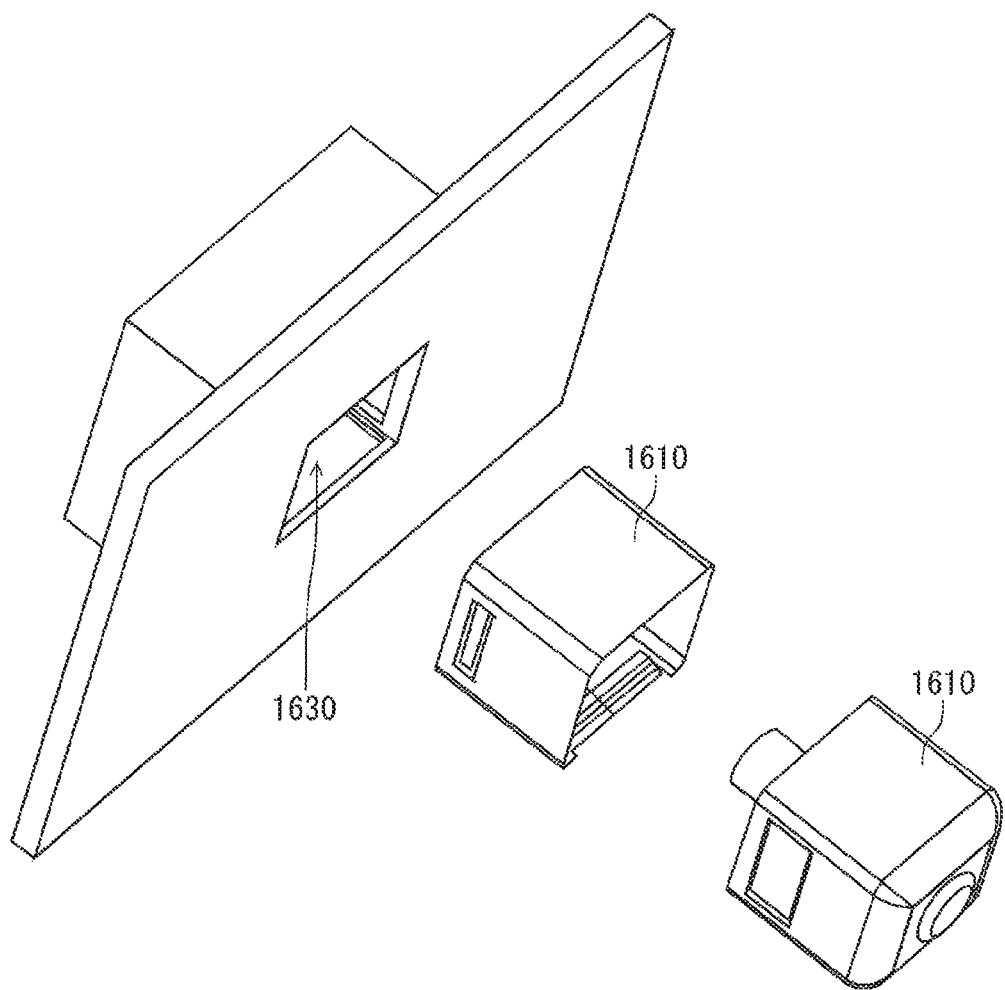
FIG. 16 is a view illustrating a state where a camera apparatus is attached to an opening of the vehicle body using a sheet metal lock jacket.

A lock jacket not including a head covering the lens of the camera apparatus or the optical window can be manufactured by sheet metal processing, for example. It is of course possible to construct an optical protection window cover (not illustrated) combining a head including a transparent member such as acrylic with a body (lock jacket) including sheet metal. FIG. 16 illustrates a state where a camera apparatus 1620 is attached to an opening 1630 of the vehicle body using a sheet metal lock jacket 1610. While this example handles the lock jacket structure as a jacket structure separate from the camera, it is allowable to integrate a mechanism for attaching to the vehicle body with a corresponding lock structure into the camera, use a hybrid configuration in which different materials are combined, or use a different type of spring from the latch unit for locking. In short, it is not necessary to be limited to a structure including one material illustrated in FIG. 16. Furthermore, in order to improve the accuracy of the fitting portion of the opening portion 1010 of the vehicle body to be fitted, the mounting portion including the opening portion 1010 is incorporated partially as the precise nested mold structure with respect to the mold for larger components manufactured as a vehicle body, making it possible to form a high-precision shape with respect to a local part to which a camera is to be mounted, while keeping a large component with a lower molding accuracy.

Figure 17:
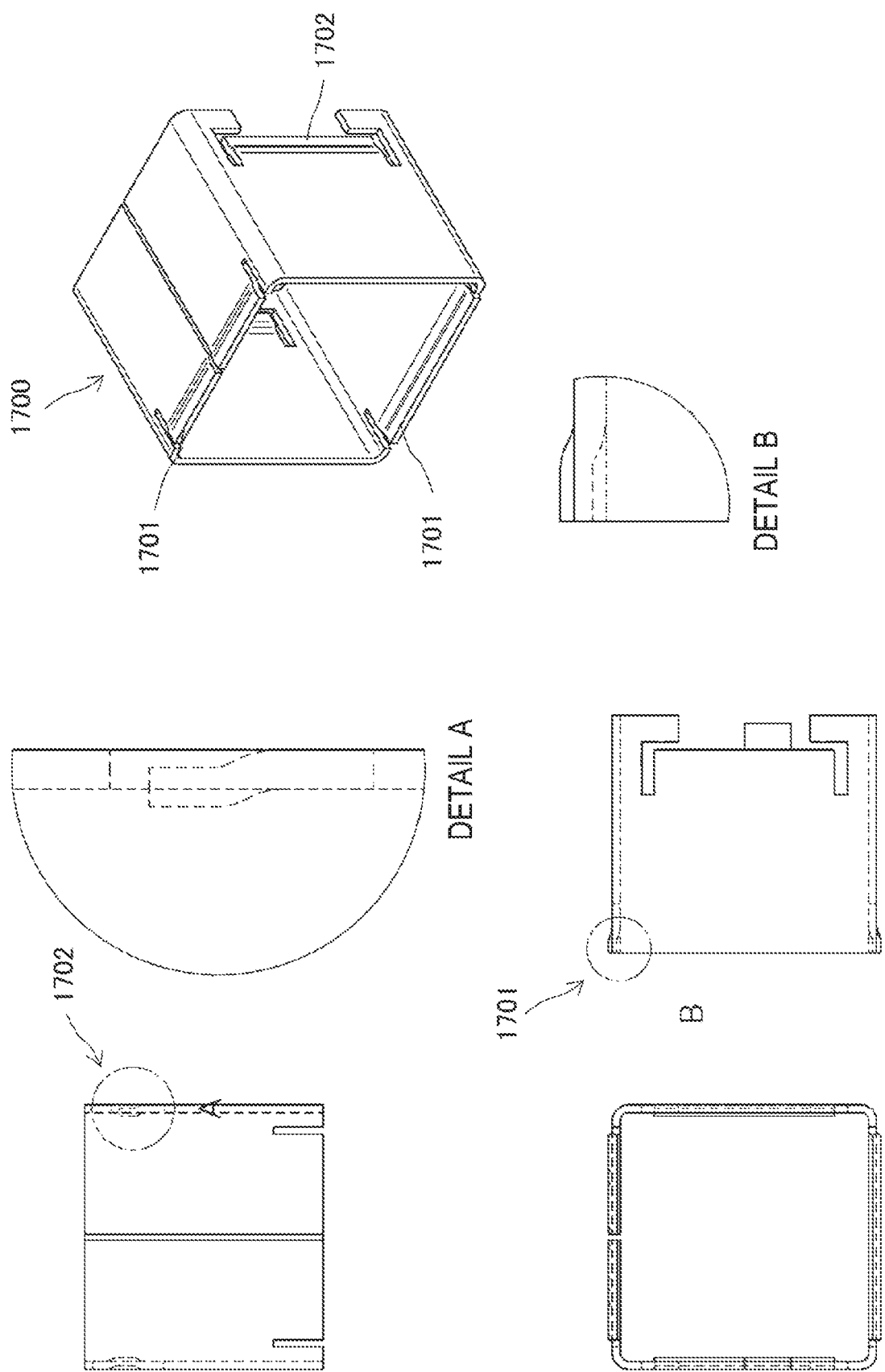
FIG. 17 is a front view, a side view, a perspective view of a sheet metal lock jacket, and a detailed view of a latch unit.

FIG. 17 illustrates a front view, a side view, a perspective view, and a detailed view of a latch unit of a lock jacket 1700 including sheet metal. The lock jacket 1700 has a tubular shape enveloping the side surface of the camera apparatus, and can be manufactured by first punching a single flat metal into a desired shape and then repeating bending processing on the metal.

The feature of the lock jacket including a latch unit for engaging with the opening of the vehicle body and another latch unit to be engaged with the camera apparatus accommodated inside is as described above with reference to FIGS. 10 to 14. In the example illustrated in FIG. 17, a latch unit 1701 for fitting with the opening of the vehicle body is a spring plate manufactured by bending a tongue piece formed at a lower edge of the flat plate as the base of the lock jacket 1700 to the outside of the cylinder. Furthermore, a latch unit 1702 for fitting with the camera apparatus is a spring plate manufactured by bending a tongue piece formed at a side edge of the flat plate as the base of the lock jacket 1700 to the inside of the cylinder. Arranging a pair of latch units 1701 at two positions on the opposing side surfaces of the lock jacket 1700 enables firm retention to the opening of the vehicle body as compared with the case where the single unit is provided, leading to suppression unlocking from the outside, or removal of the camera apparatus together with the lock jacket 1700. Similarly, arranging a pair of latch units 1702 at two positions on the opposing side surfaces of the lock jacket 1700 enables firm retention of the camera apparatus as compared with the case where the single unit is provided, leading to suppression unlocking from the outside, or removal of the camera apparatus.

For example, when the lock jacket 1700 is started to be inserted into the opening of the vehicle body, the spring plate-shaped latch unit 1701 bends so as to escape to the inside of the main body (cylinder) of the lock jacket 1700, making it possible to further insert the lock jacket 1700 into a deeper portion of the body. In addition, when the latch unit 1701 reaches the fitting portion formed on the wall surface in the vicinity of the bottom of the opening, the latch unit 1701 restores the original shape from the state in which the spring plate is bent and is fit to the fitting portion formed on the wall surface of the opening. This completes installation of the lock jacket 1700 to the vehicle body.

Furthermore, when the lock jacket 1700 is attached to the vehicle body and thereafter the camera apparatus is started to be inserted into the lock jacket 1700, a spring plate-shaped latch unit 1612 bends so as to escape to the outside of the cylinder, making it possible to further insert the camera apparatus into the deeper portion of the lock jacket 1700 (or opening). In addition, when the fitting portion formed on the side wall surface of the camera apparatus reaches the latch unit 1702 of the lock jacket 1700, the latch unit 1702 is restored to its original shape from the state in which the spring plate is bent and is fitted to the fitting portion of the camera apparatus. This completes installation of the camera apparatus to the lock jacket 1700, in a state of being locked to the vehicle body.

Figure 18:
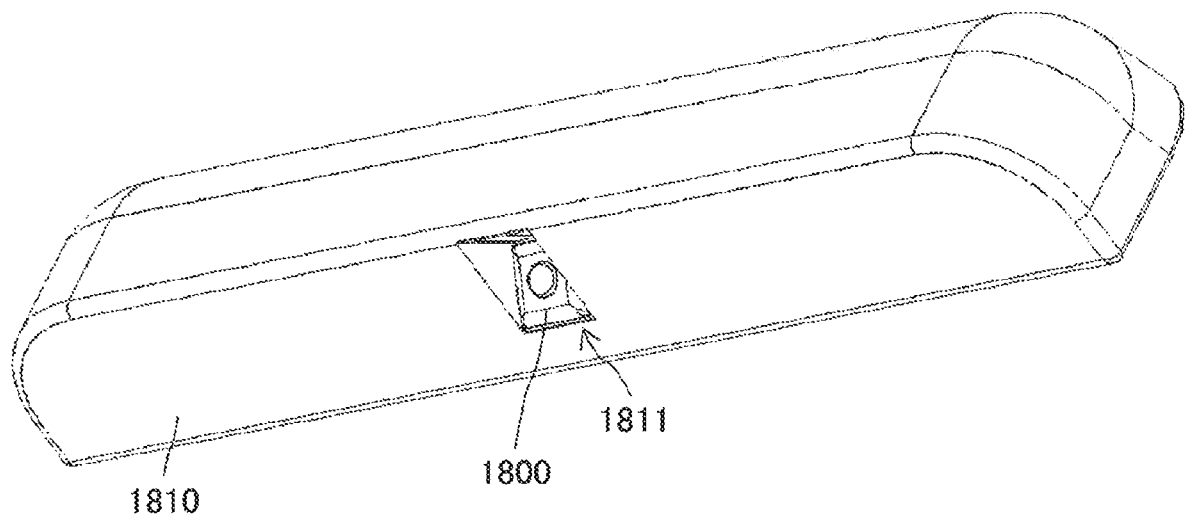
FIG. 18 is a perspective view illustrating a state in which a camera apparatus is mounted to a vehicle body using a sheet metal lock jacket.
Figure 19:
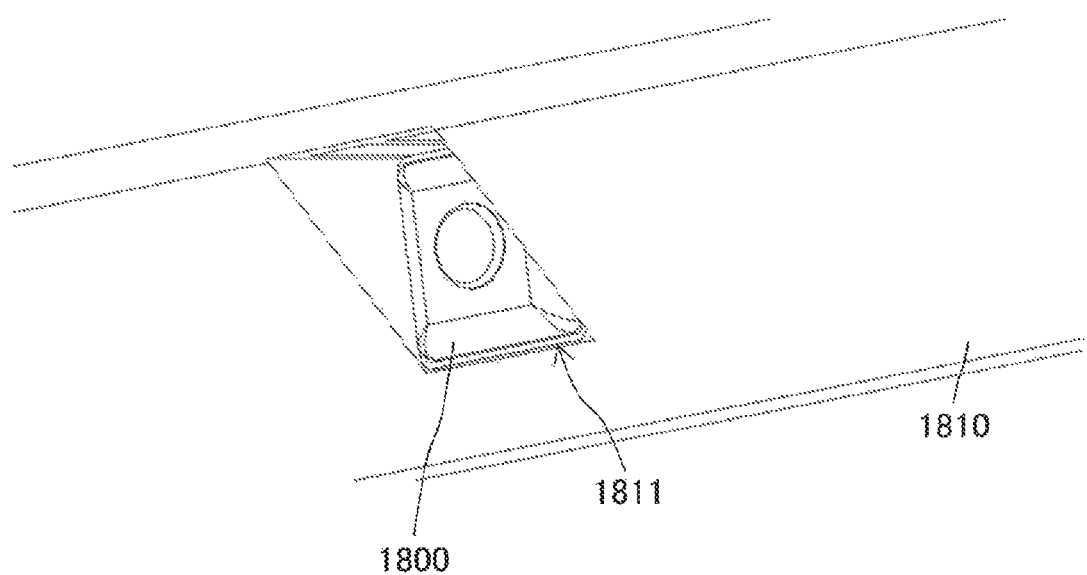
FIG. 19 is an enlarged perspective view illustrating a camera apparatus mounted to a vehicle body.
Figure 20:
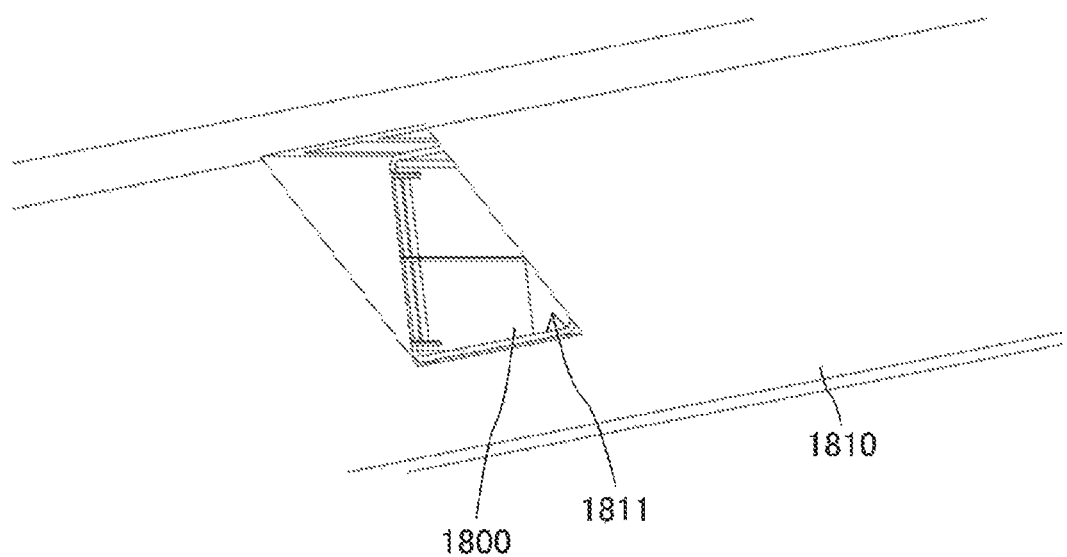
FIG. 20 is an enlarged perspective view illustrating a state where a lock jacket alone is attached to an opening of a vehicle body.

FIG. 18 is a perspective view illustrating a state where a camera apparatus 1800 is attached to an opening 1811 of a vehicle body 1810 using a sheet metal lock jacket. The vehicle body 1810 is, for example, a front grille, a rear garnish, a mirror housing, or the like. Furthermore, FIG. 19 is an enlarged view of the camera apparatus 1800 attached to the opening 1811 of the vehicle body 1810. In addition, FIG. 20 is an enlarged view illustrating a state where simply a lock jacket is attached to the opening 1811 of the vehicle body 1810 (a state in which the camera apparatus is not yet mounted).

Figure 21:
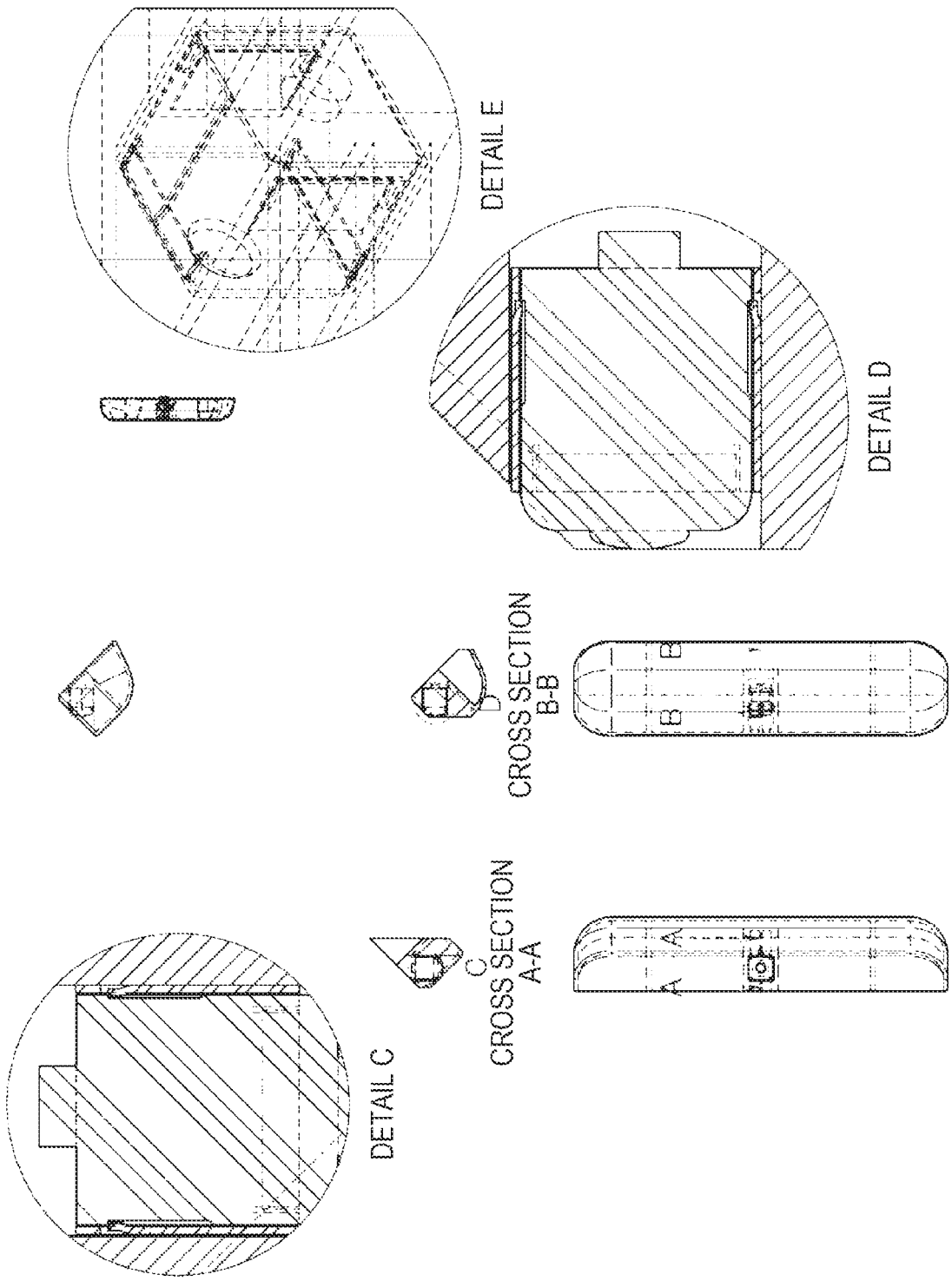
FIG. 21 is a cross-sectional view and a perspective view of a lock jacket and a camera apparatus attached to an opening of a vehicle body.

FIG. 21 illustrates a cross-sectional view and a perspective view of a lock jacket and a camera apparatus attached to the opening of the vehicle body. From this figure, it is observed that the double structure is provided in which the latching unit of the lock jacket is fitted to the fitting portion formed on the wall surface of the opening and the other latching unit of the lock jacket is fitted into the fitting portion formed on the wall surface of the camera apparatus. Such a double lock structure is configured to be unlocked only from the inside the vehicle body such as at the time of opening the trunk, for example. This makes it possible to enhance the effect of preventing the theft of removing the camera apparatus from the vehicle body.

Figure 22:
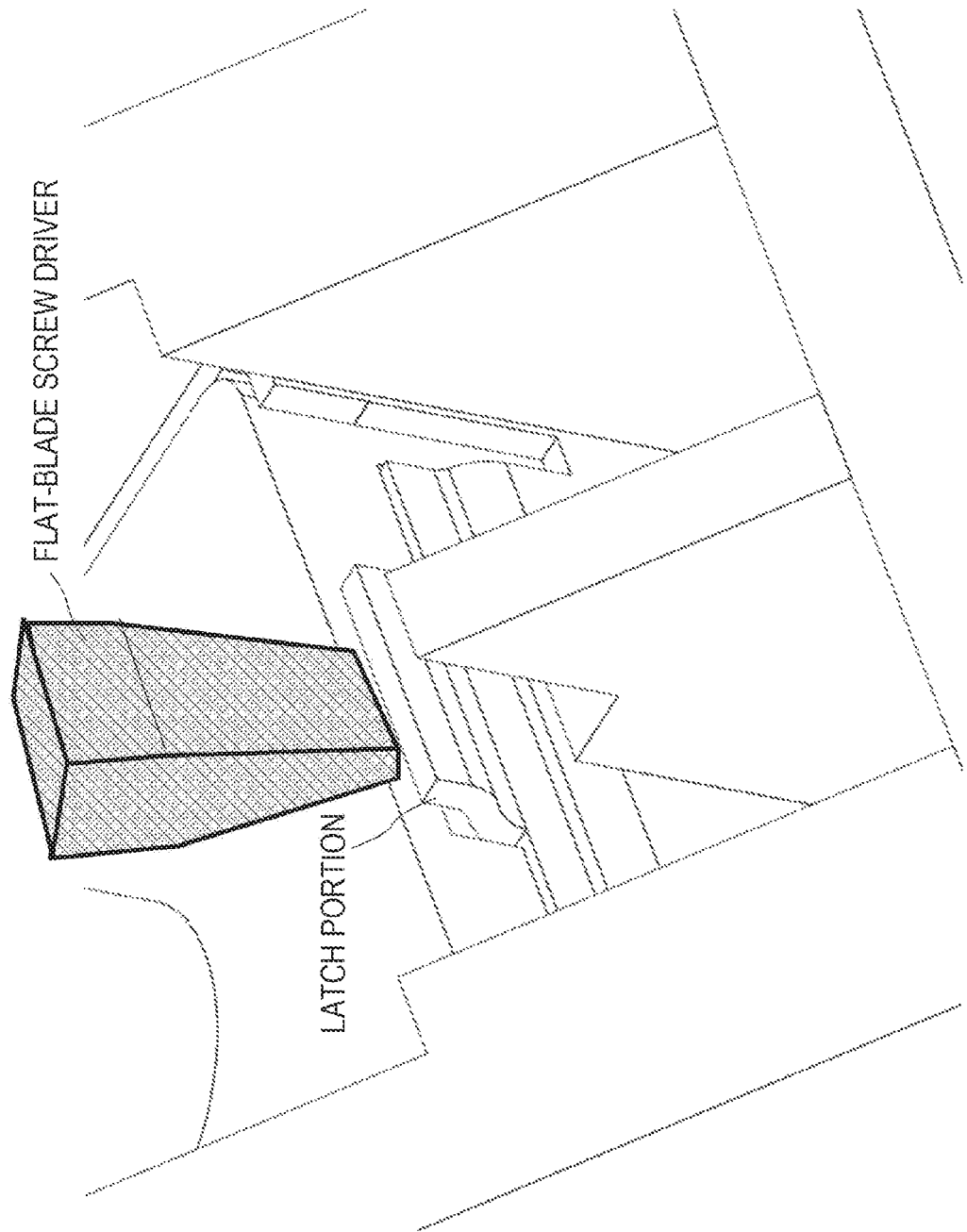
FIG. 22 is a view illustrating a state of releasing a retention state of the latch unit from the inside of the vehicle body.

Referring back to FIG. 16, both the latch unit 1611 to be engaged with the fitting portion formed in the opening 1630 of the vehicle body and the latch unit 1612 to be engaged with the fitting portion formed on the side wall surface of the camera apparatus 1620 are configured as spring plates. For example, it is possible to insert a tip of a flat-blade screwdriver or the like having a fixed prescribed thickness from the inside of the vehicle body, such as at the time of opening the trunk, into the gap of the spring plate so as to unlock the retention state of the latch unit with the opening of the vehicle body and the fitting portion of the camera apparatus (refer to FIG. 22). Enabling unlocking by inserting a tool with a prescribed thickness makes it possible to suppress extra displacement more than necessary at the time of unlatching, leading to prevention of breakage and fall by unreasonable un-latching at opening and closing at replacement.

Figure 23:
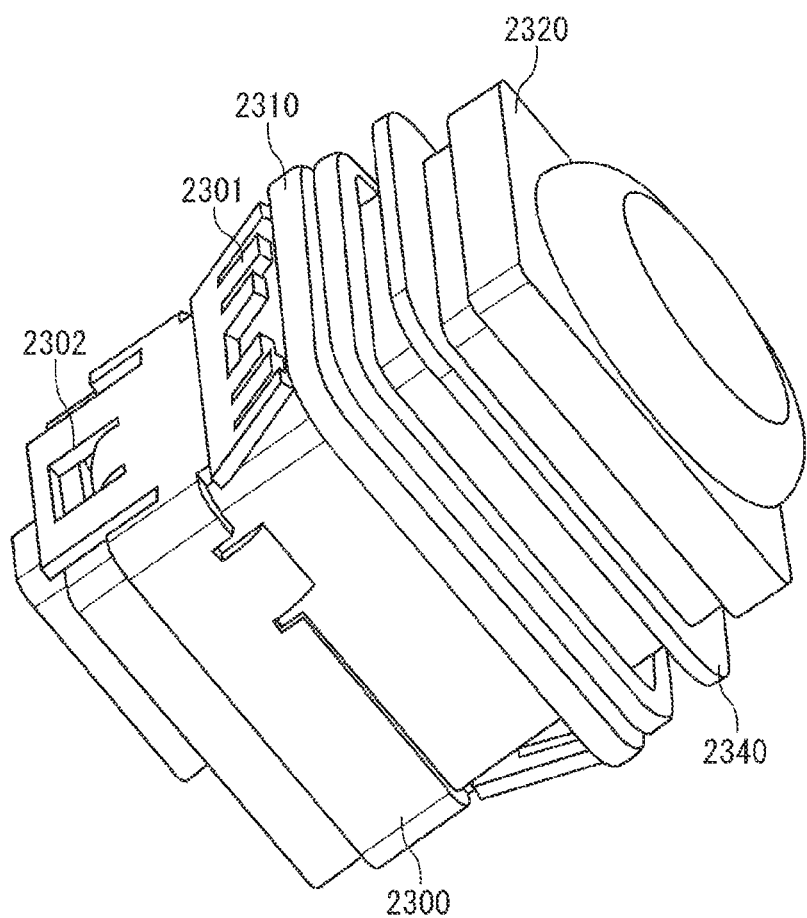
FIG. 23 is a view illustrating another configuration example of a lock jacket 2300 including sheet metal.
Figure 24:
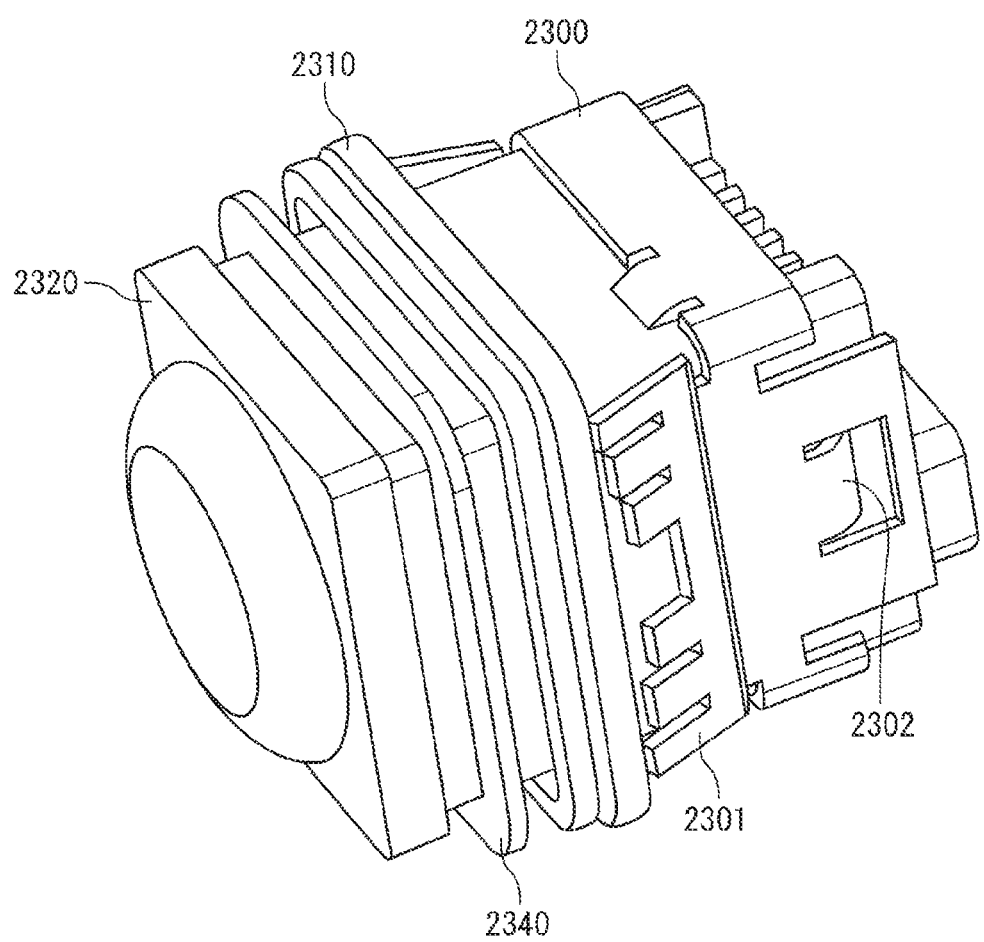
FIG. 24 is a diagram illustrating another configuration example of the lock jacket 2300 including sheet metal.

FIGS. 23 and 24 illustrate another configuration example of a lock jacket 2300 including sheet metal. The illustrated example differs from the configuration example illustrated in FIGS. 16 to 21 in that the lock jacket 2300 is combined with a waterproof ring 2310.

The lock jacket 2300 includes a pair of latch units 2301 to be secured to an opening (not illustrated) of the vehicle body and a pair of latch units 2302 for securing a camera apparatus 2320 to the inside. Although the lock jacket 1610 illustrated in FIGS. 16 to 21 covers substantially the entire side surface of the camera apparatus, the lock jacket 2300 illustrated in FIG. 22 covers substantially the lower half of the side surface of the camera apparatus 2320.

On the upper side of the lock jacket 2300 (lens side of the camera apparatus 2320), a waterproof ring 2310 including an elastomer or the like is attached. Further above the waterproof ring 2310, there is provided a collar-shaped block member 2340 for blocking straight high-speed running water such as high-pressure washing water so as to prevent the water flowing in at high speed from directly hitting the interface with the waterproof ring 2310, leading to further enhancement of the effect of waterproofing.

Figure 25:
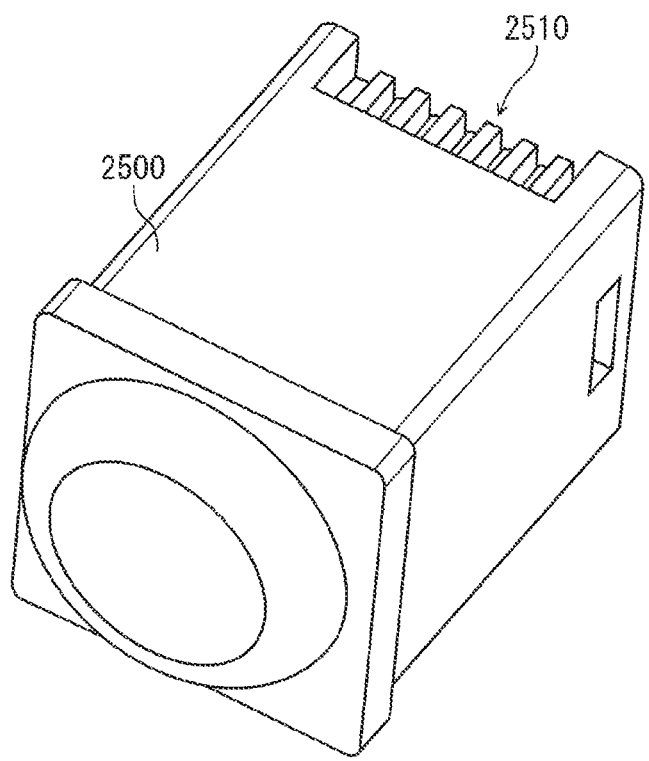
FIG. 25 is a view illustrating an example of a configuration of an electrical contact with the outside of a camera apparatus 2500.
Figure 26:
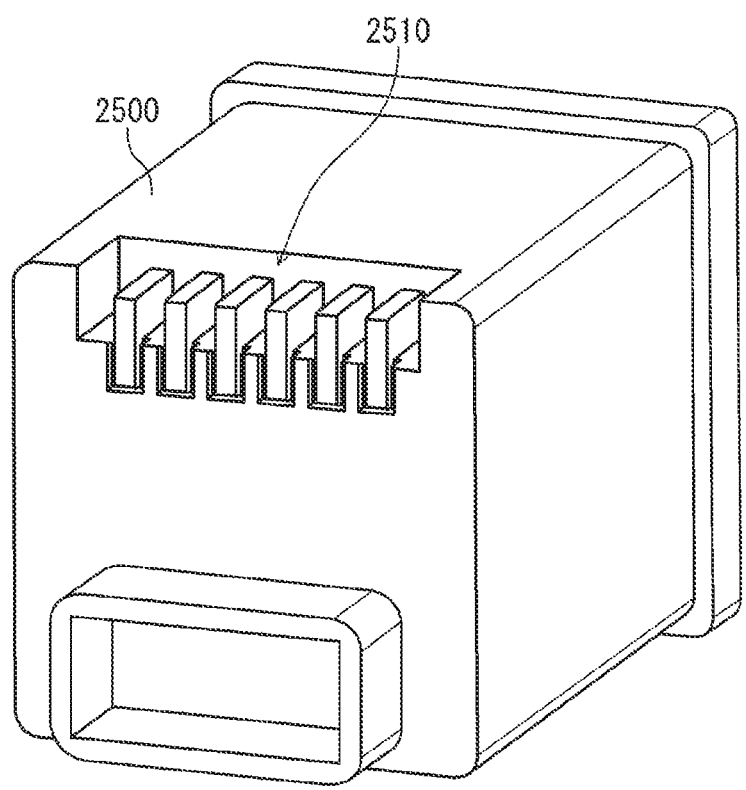
FIG. 26 is a view illustrating a configuration example of an electrical contact with the outside of the camera apparatus 2500.
Figure 27:
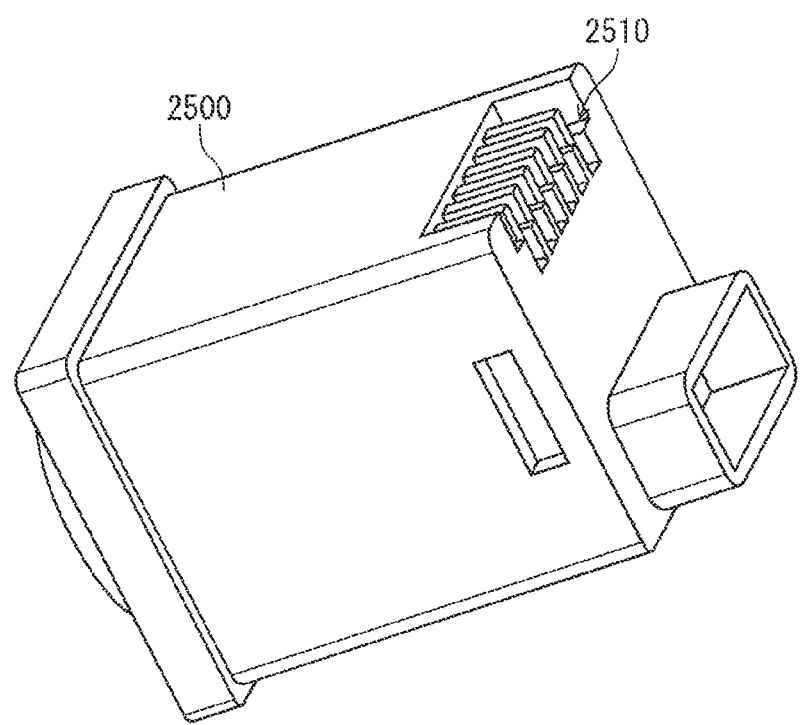
FIG. 27 is a view illustrating a configuration example of an electrical contact with the outside of the camera apparatus 2500.

FIGS. 25 to 27 illustrate examples of a configuration of an electrical contact with the outside of a camera apparatus 2500. The illustrated example includes a connector plug 2510 having a plurality of plate-shaped or blade-shaped electrodes arranged in parallel provided on one side edge of the back surface (the bottom surface opposite to the lens or the optical window) of the main body of the camera apparatus 2500. Corresponding to this connector plug 2510, it is assumed that a connector receptacle (not illustrated) including a plurality of slit-like terminals for receiving the individual plugs of the connector plug 2510 is provided at a corresponding position of the opening of the vehicle body. It is assumed that the electrical contact between the camera apparatus 2500 and the outside preferably uses four to six signal lines and the connector plug 2510 includes four to six electrodes, accordingly.

In addition, when the camera apparatus 2500 is inserted into the opening of the vehicle body, each of the plate-like or blade-like electrodes included in the connector plug 2510 is slidably inserted into each of the slit-shaped terminals on the connector receptacle disposed in a corresponding position of the opening of the vehicle body. Allowing the electrode to come in contact with the slit-shaped terminal in a surface contact enables acquisition of a large contact area, making it possible to implement highly reliable electrical connection of the connector including such a connector plug and the connector receptacle. Note that the connector structure including a connector plug formed with a plurality of plate-shaped or blade-shaped electrodes and including the connector receptacle formed with a plurality of slit-like terminals is a known structure (refer to Patent Document 3, for example).

As illustrated in FIGS. 25 to 27, when the plugs constituting the connector plug 2510 are oriented in a direction perpendicular to the optical axis of the lens of the camera apparatus 2500, the camera apparatus 2500 is preferably inserted slidably into the connector receptacle on the opening side of the vehicle body by pressing the camera apparatus 2500 in the direction in which the electrodes of the connector plug 2510 are oriented.

Figure 28:
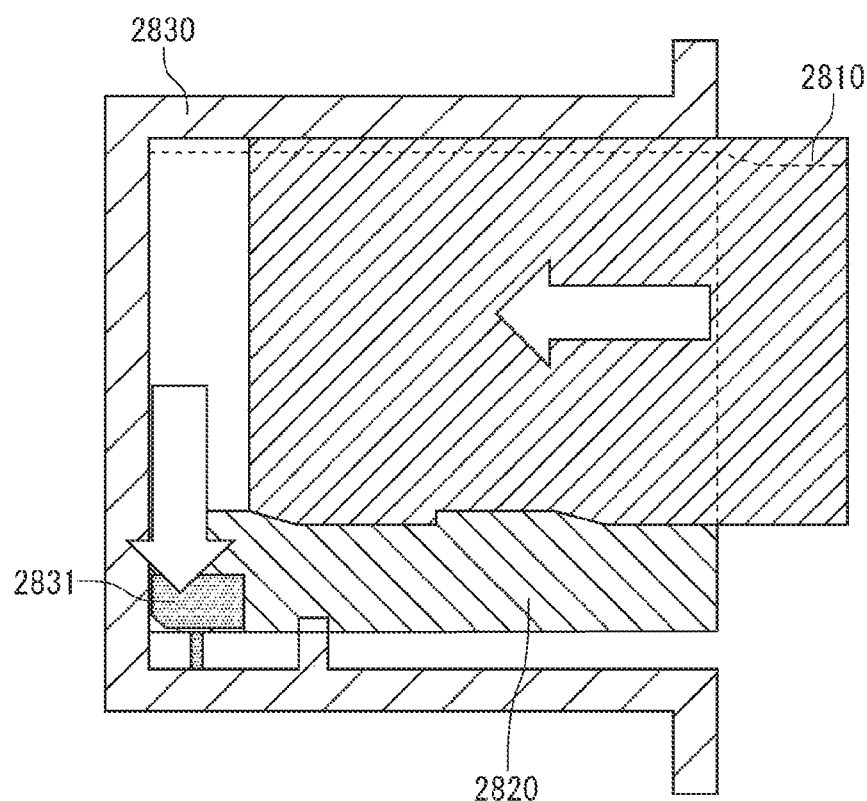
FIG. 28 is a view illustrating a state in which a camera apparatus having a cam structure and a lock jacket are attached to an opening of a vehicle body.
Figure 29:
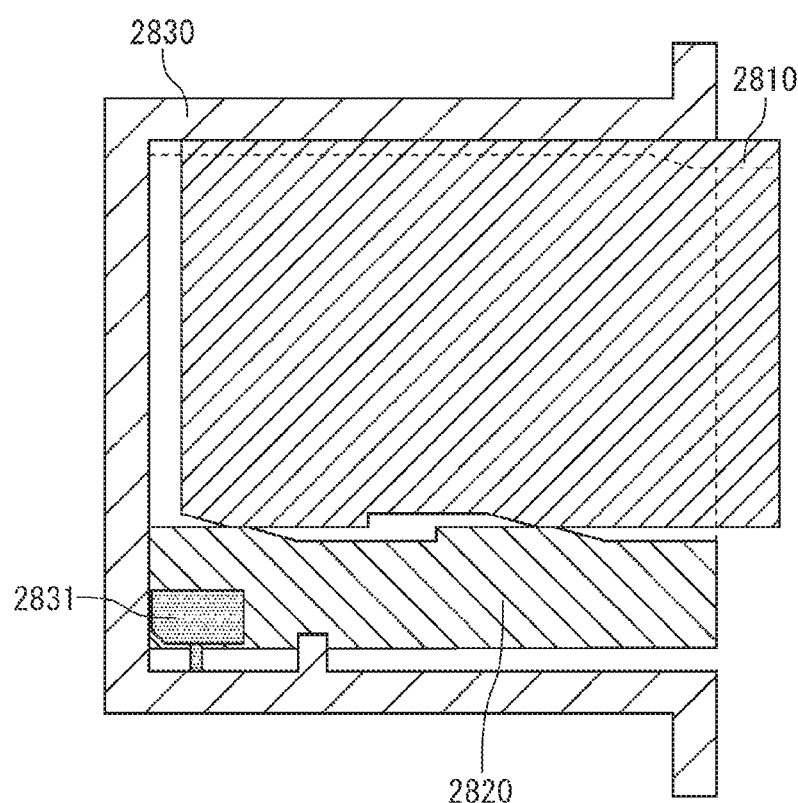
FIG. 29 is a view illustrating a state in which a camera apparatus having a cam structure and a lock jacket are attached to an opening of a vehicle body.

For example, as illustrated in FIGS. 28 and 29, it is possible to include a cam structure having a response shape in a direction perpendicular to the insertion direction provided on an outer wall of a camera apparatus 2810 and an inner wall of a lock jacket 2820, along a depth direction (direction of insertion into the opening of the vehicle body) and then, it is possible to activate a force to press a connector plug (not illustrated) of the camera apparatus 2810 toward a connector receptacle 2831 of an opening 2830 of the vehicle body, enabling suitable sliding insertion of the connector plug into the connector 2831.

Figure 30:
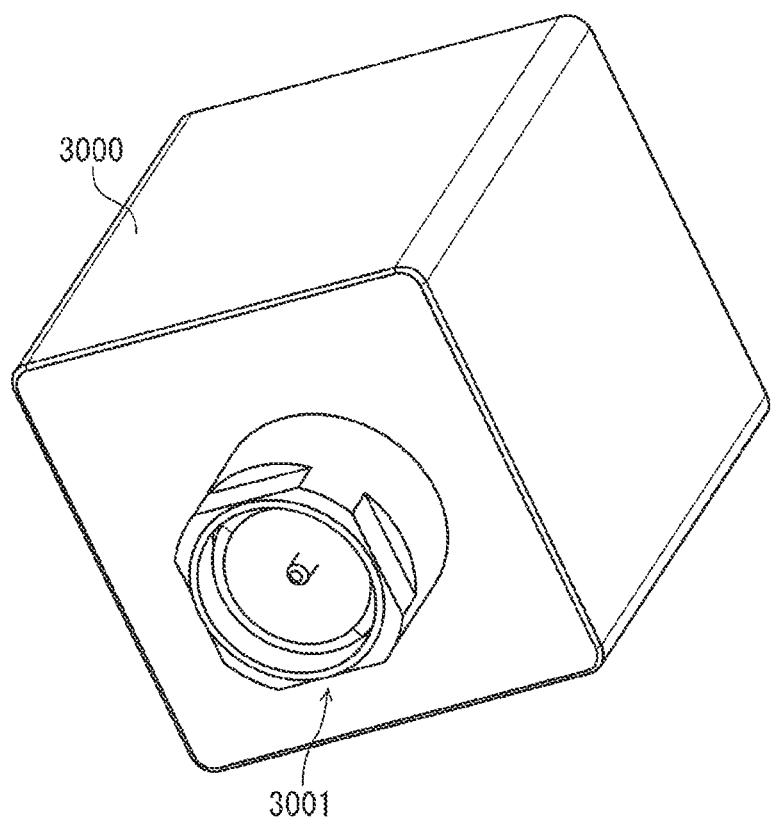
FIG. 30 is a view illustrating another configuration example of an electrical contact with the outside of the camera apparatus 3000.

Furthermore, FIG. 30 illustrates another configuration example of an electrical contact with the outside of a camera apparatus 3000. In the illustrated example, a coaxial cable is used for electrical connection between the camera apparatus 3000 and the outside (vehicle body), and a connector plug 3001 for a coaxial cable is provided on a back surface (bottom surface on the opposite side to the lens or the optical window) of the camera apparatus 3000. Although not illustrated, it is assumed that a connector receptacle for a coaxial cable compatible with the connector plug 3001 is disposed at a corresponding position on the bottom surface of the opening of the vehicle body. In such a case, a signal line and a power line can be superimposed and transmitted via the coaxial cable, between the camera apparatus 3000 and the vehicle. Electrical connection using a coaxial cable has advantages such as capability of suppression of leakage of electromagnetic waves to the outside and capability of transmission in a wide frequency range.

As for the method of connecting the connector plug 3001 and the camera apparatus 3000, as illustrated in FIG. 5, the connector plug 3001 is provisionally held at a position enabling its positional relationship with the camera apparatus 3000 being fitted with the connector receptor portion on the back surface of the lens of the camera apparatus 3000, and then, the camera apparatus 3000 is pushed in and fixed to a predetermined fixing position, whereby the plug and the receptor of the connector are fitted to each other to complete the electrical connection. In this fitted configuration, for example, there is provided a wall surface 511 to suppress escape of the connector plug portion attached to the tip of a harness in FIG. 5 to the back side of the camera mounting portion. Such a configuration would enable a structure that suppresses removal of the connector portion after fixation of the connector receptacle by the connector plug 3001 on the back side of the camera apparatus 300, even when the harness is pulled, making it possible achieve high removal resistance tolerance. In other words, the main body of the camera apparatus 3000 acts like a key of a puzzle box. Mounting the camera apparatus 3000 to a predetermined position can enhance the harness removal resistance capability.

In the above embodiments, the precise fixing member of the camera is illustrated as a mounting structure as a separate component separated as a jacket. Alternatively, however, it is also possible to incorporate a component corresponding to the jacket integrally with a component on the vehicle body side, or integrally with the camera side components, and it is not limited to the exemplified embodiment of the present specification. Examples of a method of integrating the jacket to the attachment site of either the vehicle body side or the camera side include adhesion, ultrasonic welding, laser welding, integral insert molding, outsert incorporation, thermal welding, and the like.

Furthermore, while the vehicle body 1810 is molded with ordinary molding accuracy and thus manufactured with a general tolerance molding accuracy, there is provided a nested structure created with more precise mold as a part of a mold at the molding formed in a recessed shape in the opening 1811 for mounting the camera, separate from site for forming a large component. This configuration makes it possible to improve and assure the accuracy of the mounting direction of the opening 1811 for mounting the camera and to further improve the mounting accuracy of the camera. Additionally, preparing as a high precision nested configurations of the recessed shape for the fitting portion to which this camera is mounted would enable common use of the nested configuration created for common use even for the vehicle body structural shapes differing for individual vehicle types and customers, leading to easy maintenance of a high mounting accuracy as a fitting for mounting the camera.

INDUSTRIAL APPLICABILITY

The technology disclosed in the present specification has been described in detail with reference to specific embodiments. Still, it is self-evident that those skilled in the art can make modifications and substitutions of the embodiments without departing from the scope and spirit of the technology disclosed in the present disclosure.

The technology disclosed in the present specification can be applied to installation of an in-vehicle camera to a vehicle body used in a state of being attached to a vehicle for various uses such as a view monitor and image recognition.

In general, the vehicle corresponds to a four-wheeled automobile under the Road Traffic Act. However, the technology disclosed in the present specification can be similarly applied to railway vehicles, construction vehicles, and agricultural vehicles in addition to general vehicles. Furthermore, the technology disclosed in the present specification can similarly be applied to various types of mobile devices such as aircraft, ships, small unmanned aircraft (drones), or robots.

In short, the technology disclosed in the present specification has been described in the form of exemplification, and the contents of the description of the present specification should not be interpreted restrictively. For determination of the scope and spirit of the technology disclosed in the present specification, the appended claims should be taken into consideration.

Note that the technology disclosed in the present specification may have the following configuration.

(1) A camera mounting structure including:
an opening formed in a vehicle body for accommodating an in-vehicle camera; and
a jacket retained on the opening and configured to retain the in-vehicle camera.

(2) The camera mounting structure according to (1),
in which the jacket includes a body that covers a side surface of the in-vehicle camera.

(3) The camera mounting structure according to any of (1) or (2),
in which the jacket further includes a transparent head that covers a lens or an optical window of the in-vehicle camera.
(4) The camera mounting structure according to (3),
in which the head is disposed to be separated from the lens or the optical window of the in-vehicle camera.
(5) The camera mounting structure according to any of (1) to (4),
further including a waterproof part configured to prevent water flowing into a gap between the opening and the in-vehicle camera.
(6) The camera mounting structure according to (5),
in which the jacket includes an influent trap in front of the waterproof part.
(7) The camera mounting structure according to any of (1) to (6),
in which the jacket includes a first latch unit, and the opening includes a first fitting portion to be fitted with the first latch unit.
(8) The camera mounting structure according to any of (1) to (7),
in which the jacket includes a second latch unit, and the in-vehicle camera includes a second fitting portion to be fitted with the second latch unit.
(9) The camera mounting structure according to any of (1) to (8),
further including a connector to electrically connect the in-vehicle camera to the vehicle body at the opening.
(10) The camera mounting structure according to (9),
in which the connector includes: a connector plug disposed in the in-vehicle camera; and a connector receptacle disposed at a corresponding location on the opening.
(11) The camera mounting structure according to (10),
in which the connector plug further includes a cam structure to be slidably inserted into the connector receptacle when the in-vehicle camera is inserted into the opening.
(12) The camera mounting structure according to (9),
in which the electrical connection is implemented by using a coaxial cable.
(13) The camera mounting structure according to any of (1) to (12),
in which the opening is molded by a second mold created separately from a first mold designed for molding the vehicle body, the second mold being incorporated as a nested structure into a part of the first mold.
(14) The camera mounting structure according to any of (1) to (13),
in which the jacket is integrated with the vehicle body.
(15) The camera mounting structure according to any of (1) to (13),
in which the jacket is integrated with the in-vehicle camera.
(14) A camera apparatus to be mounted to an opening of a vehicle body using a jacket,
the camera apparatus including:
a fitting portion to be fitted with a latch on the jacket side; and
a connector electrically connected to the vehicle body at the opening.
(15) A jacket to be mounted to an opening of a vehicle body into which a camera apparatus is to be inserted,
the jacket including:
a first latch to be fitted to the opening; and
a second latch to be fitted to the camera apparatus.

REFERENCE SIGNS LIST

100 In-vehicle camera system
101 Front view camera
102 Rear view camera
103, 104 Side view camera
105 Cabin view camera
111 Front view camera ECU
112 Rear view camera ECU
113, 114 Side view camera ECU
120 Image composition ECU
130 Shift lever
140 Display
200 Camera apparatus
210 Housing
211 Front case
212 Rear Case
213 Lens
214 Connector
215 Connector
220 Front substrate
221 Imaging element
230 Rear substrate
300 Opening
301 Connector receptacle
500 Camera
501 Lens
503 Optical protection window cover
510 Opening
601 Head
602 Body
603 Waterproof ring
800 Lock jacket
801 Waterproof ring
802 Influent trap
901 Camera apparatus
902 Lock jacket
903 Opening (vehicle body)
1000 Lock jacket
1001 Waterproof ring
1002 Latch unit
1003 Latch unit
1010 Opening (vehicle body)
1011 Fitting portion
1020 Camera apparatus
1021 Fitting portion
1501 Linear protrusion
1502 Influent trap
1610 Lock jacket
1620 Camera apparatus
1630 Opening (vehicle body)
1700 Lock jacket
1701 Latch unit
1702 Latch unit
1800 Camera apparatus
1810 Vehicle body
1811 Opening
2300 Lock jacket
2301 Latch unit
2302 Latch unit
2310 Waterproof ring
2320 Camera apparatus
2340 Block member
2500 Camera apparatus
2510 Connector plug 2810 Camera apparatus
2820 Lock jacket
2830 Opening (vehicle body)
2831 Connector receptacle

The invention claimed is:

1. A camera mounting structure, comprising:
   an opening in a vehicle body to accommodate an in-vehicle camera; and
   a jacket configured to retain the in-vehicle camera in the opening of the vehicle body, wherein
   the jacket includes:
      a body; and
      a waterproof part configured to prevent flow of water into a gap between the opening of the vehicle body and the in-vehicle camera,
   the waterproof part is at a middle portion, of the body of the jacket, in a depth direction of the opening,
   the waterproof part is crushed between a wall surface of the opening of the vehicle body and a side wall surface of the in-vehicle camera, in a case where the jacket and the in-vehicle camera are inserted into the opening of the vehicle body, and
   a portion of the body of the jacket is below the waterproof part in the depth direction of the opening.

2. The camera mounting structure according to claim 1, wherein the body of the jacket is configured to cover the side wall surface of the in-vehicle camera.

3. The camera mounting structure according to claim 1, wherein the jacket further includes a transparent head configured to cover one of a lens or an optical window of the in-vehicle camera.

4. The camera mounting structure according to claim 3, wherein a position of the transparent head of the jacket is different from a position of the one of the lens or the optical window of the in-vehicle camera, in the case where the jacket and the in-vehicle camera are inserted into the opening of the vehicle body.

5. The camera mounting structure according to claim 1, wherein the jacket further includes an influent trap in front of the waterproof part.

6. The camera mounting structure according to claim 1, wherein
   the jacket further includes a latch unit, and
   the opening includes a fitting portion configured to fit with the latch unit.

7. The camera mounting structure according to claim 1, wherein
   the jacket further includes a latch unit, and
   the in-vehicle camera includes a fitting portion configured to fit with the latch unit.

8. The camera mounting structure according to claim 1, further comprising a connector configured to electrically connect the in-vehicle camera to the vehicle body.

9. The camera mounting structure according to claim 8, wherein the connector includes:
   a connector plug in the in-vehicle camera; and
   a connector receptacle, wherein the connector receptacle is insertable at a specific location on the opening of the vehicle body.

10. The camera mounting structure according to claim 9, wherein the connector plug further includes a cam structure slidably insertable into the connector receptacle, in a case where the in-vehicle camera is inserted into the opening.

11. The camera mounting structure according to claim 8, wherein the electrical connection is implemented by a coaxial cable.

12. The camera mounting structure according to claim 1, wherein
   the opening is molded by a first mold,
   the vehicle body is molded by a second mold, and
   the first mold is incorporated as a nested structure into a part of the second mold.

13. The camera mounting structure according to claim 1, wherein the jacket is integrated with the vehicle body.

14. The camera mounting structure according to claim 1, wherein the jacket is integrated with the in-vehicle camera.

15. A camera apparatus, comprising:
   a fitting portion configured to fit with a latch of a jacket, wherein
      the camera apparatus is mountable, in an opening of a vehicle body, by the jacket,
      the jacket includes a waterproof part at a middle portion, of a body of the jacket, in a depth direction of the opening,
      the latch of the jacket is below the waterproof part in the depth direction of the opening, and
      the latch of the jacket is fit in with the fitting portion of the camera apparatus; and
   a connector configured to electrically connect to the vehicle body.

16. A jacket, comprising:
   a body;
   a first latch configured to fit to an opening of a vehicle body, wherein the jacket and a camera apparatus are insertable into the opening of the vehicle body;
   a waterproof part configured to prevent flow of water into a gap between the opening of the vehicle body and the camera apparatus, wherein
      the waterproof part is at a middle portion, of the body of the jacket, in a depth direction of the opening,
      the waterproof part is crushed between a wall surface of the opening of the vehicle body and a side wall surface of the camera apparatus, in a case where the jacket and the camera apparatus are inserted into the opening of the vehicle body, and
      a portion of the body of the jacket is below the waterproof part in the depth direction of the opening; and
   a second latch configured to fit to the camera apparatus.

* * * * *